(12) United States Patent
Danilak et al.

(10) Patent No.: US 8,055,833 B2
(45) Date of Patent: Nov. 8, 2011

(54) SYSTEM AND METHOD FOR INCREASING CAPACITY, PERFORMANCE, AND FLEXIBILITY OF FLASH STORAGE

(75) Inventors: Radoslav Danilak, Cupertino, CA (US); Michael J. S. Smith, Palo Alto, CA (US); Suresh Rajan, Jose, CA (US)

(73) Assignee: Google Inc., Mountain View, CA (US)

( * ) Notice: Subject to any disclaimer, the term of this patent is extended or adjusted under 35 U.S.C. 154(b) by 393 days.

(21) Appl. No.: 11/611,374

(22) Filed: Dec. 15, 2006

(65) Prior Publication Data

US 2008/0086588 A1 Apr. 10, 2008

Related U.S. Application Data

(60) Provisional application No. 60/849,631, filed on Oct. 5, 2006.

(51) Int. Cl.
G06F 12/00 (2006.01)

(52) U.S. Cl. .................................................. 711/103

(58) Field of Classification Search .................. None
See application file for complete search history.

(56) References Cited

U.S. PATENT DOCUMENTS

| | | | |
|---|---|---|---|
| 3,800,292 A | 3/1974 | Curley et al. | |
| 4,069,452 A | 1/1978 | Conway et al. | |
| 4,323,965 A | 4/1982 | Johnson et al. | |
| 4,334,307 A | 6/1982 | Bourgeois et al. | |
| 4,345,319 A | 8/1982 | Bernardini et al. | |
| 4,392,212 A | 7/1983 | Miyasaka et al. | 365/230 |
| 4,525,921 A | 7/1985 | Carson et al. | 29/577 |
| 4,566,082 A | 1/1986 | Anderson | |
| 4,592,019 A | 5/1986 | Huang et al. | 365/78 |
| 4,646,128 A | 2/1987 | Carson et al. | 357/74 |
| 4,698,748 A | 10/1987 | Juzswik et al. | 364/200 |
| 4,706,166 A | 11/1987 | Go | 361/403 |
| 4,710,903 A | 12/1987 | Hereth et al. | 365/194 |
| 4,764,846 A | 8/1988 | Go | 361/388 |
| 4,780,843 A | 10/1988 | Tietjen | 364/900 |
| 4,794,597 A | 12/1988 | Ooba et al. | |
| 4,796,232 A | 1/1989 | House | 365/189 |
| 4,841,440 A | 6/1989 | Yonezu et al. | 364/200 |
| 4,862,347 A | 8/1989 | Rudy | |
| 4,884,237 A | 11/1989 | Mueller et al. | 365/63 |
| 4,887,240 A | 12/1989 | Garverick et al. | 361/222 |

(Continued)

FOREIGN PATENT DOCUMENTS

DE 102004051345 5/2006

(Continued)

OTHER PUBLICATIONS

Kellerbauer "Die Schnelle Million," with translation, "The quick million."

(Continued)

*Primary Examiner* — Brian Peugh
(74) *Attorney, Agent, or Firm* — Fish & Richardson P.C.

(57) ABSTRACT

In one embodiment, an interface circuit is configured to couple to one or more flash memory devices and is further configured to couple to a host system. The interface circuit is configured to present at least one virtual flash memory device to the host system, wherein the interface circuit is configured to implement the virtual flash memory device using the one or more flash memory devices to which the interface circuit is coupled.

19 Claims, 10 Drawing Sheets

U.S. PATENT DOCUMENTS

| | | | |
|---|---|---|---|
| 4,888,687 A | 12/1989 | Allison et al. | |
| 4,899,107 A | 2/1990 | Corbett et al. | 324/158 |
| 4,912,678 A | 3/1990 | Mashiko | |
| 4,922,451 A | 5/1990 | Lo et al. | |
| 4,935,734 A | 6/1990 | Austin | 340/825.83 |
| 4,937,791 A | 6/1990 | Steele et al. | |
| 4,956,694 A | 9/1990 | Eide | |
| 4,982,265 A | 1/1991 | Watanabe et al. | 357/75 |
| 4,983,533 A | 1/1991 | Go | 437/7 |
| 5,025,364 A | 6/1991 | Zellmer | |
| 5,072,424 A | 12/1991 | Brent et al. | 365/189 |
| 5,083,266 A | 1/1992 | Watanabe | 395/275 |
| 5,104,820 A | 4/1992 | Go et al. | 437/51 |
| 5,220,672 A | 6/1993 | Nakao et al. | 395/750 |
| 5,241,266 A | 8/1993 | Ahmad et al. | 324/158 |
| 5,252,807 A | 10/1993 | Chizinsky | 219/390 |
| 5,257,233 A | 10/1993 | Schaefer | 365/227 |
| 5,278,796 A | 1/1994 | Tillinghast et al. | 365/211 |
| 5,282,177 A | 1/1994 | McLaury | 365/230 |
| 5,332,922 A | 7/1994 | Oguchi et al. | 257/723 |
| 5,347,428 A | 9/1994 | Carson et al. | 361/760 |
| 5,384,745 A | 1/1995 | Konishi et al. | 365/230.03 |
| 5,388,265 A | 2/1995 | Volk | 395/750 |
| 5,390,334 A | 2/1995 | Harrison | |
| 5,408,190 A | 4/1995 | Wood et al. | 324/765 |
| 5,432,729 A | 7/1995 | Carson et al. | 365/63 |
| 5,448,511 A | 9/1995 | Paurus et al. | 365/52 |
| 5,453,434 A | 9/1995 | Albaugh et al. | 514/397 |
| 5,467,455 A | 11/1995 | Gay et al. | 395/281 |
| 5,483,497 A | 1/1996 | Mochizuki et al. | |
| 5,498,886 A | 3/1996 | Hsu et al. | 257/213 |
| 5,502,333 A | 3/1996 | Bertin et al. | |
| 5,502,667 A | 3/1996 | Bertin et al. | 365/51 |
| 5,513,135 A | 4/1996 | Dell et al. | |
| 5,513,339 A | 4/1996 | Agrawal et al. | |
| 5,519,832 A | 5/1996 | Warchol | |
| 5,526,320 A | 6/1996 | Zagar et al. | 365/233 |
| 5,530,836 A | 6/1996 | Busch et al. | 395/477 |
| 5,550,781 A | 8/1996 | Sugawara et al. | |
| 5,559,990 A | 9/1996 | Cheng et al. | 395/484 |
| 5,561,622 A | 10/1996 | Bertin et al. | 365/51 |
| 5,563,086 A | 10/1996 | Bertin et al. | 437/52 |
| 5,566,344 A | 10/1996 | Hall et al. | 395/800 |
| 5,581,498 A | 12/1996 | Ludwig et al. | 365/63 |
| 5,581,779 A | 12/1996 | Hall et al. | 395/800 |
| 5,590,071 A | 12/1996 | Kolor et al. | 365/149 |
| 5,598,376 A | 1/1997 | Merritt et al. | 365/230 |
| 5,604,714 A | 2/1997 | Manning et al. | 365/230 |
| 5,606,710 A | 2/1997 | Hall et al. | 395/800 |
| 5,608,262 A | 3/1997 | Degani et al. | 257/723 |
| 5,610,864 A | 3/1997 | Manning | 365/193 |
| 5,623,686 A | 4/1997 | Hall et al. | 395/800 |
| 5,627,791 A | 5/1997 | Wright et al. | 365/222 |
| 5,640,337 A | 6/1997 | Huang et al. | 364/578 |
| 5,640,364 A | 6/1997 | Merritt et al. | 365/233 |
| 5,652,724 A | 7/1997 | Manning | 365/189 |
| 5,654,204 A | 8/1997 | Anderson | 438/15 |
| 5,661,677 A | 8/1997 | Rondeau et al. | 365/63 |
| 5,661,695 A | 8/1997 | Zagar et al. | 365/233 |
| 5,668,773 A | 9/1997 | Zagar et al. | 365/233 |
| 5,675,549 A | 10/1997 | Ong et al. | 365/233 |
| 5,680,342 A | 10/1997 | Frankeny | 365/52 |
| 5,682,354 A | 10/1997 | Manning | 365/233 |
| 5,692,121 A | 11/1997 | Bozso et al. | |
| 5,692,202 A | 11/1997 | Kardach et al. | 395/750 |
| 5,696,732 A | 12/1997 | Zagar et al. | 365/233 |
| 5,702,984 A | 12/1997 | Bertin et al. | 437/208 |
| 5,703,813 A | 12/1997 | Manning et al. | 365/189 |
| 5,706,247 A | 1/1998 | Merritt et al. | 365/233 |
| RE35,733 E | 2/1998 | Hernandez et al. | |
| 5,717,654 A | 2/1998 | Manning | 365/233 |
| 5,721,859 A | 2/1998 | Manning | 397/421 |
| 5,724,288 A | 3/1998 | Cloud et al. | 365/193 |
| 5,729,503 A | 3/1998 | Manning | 365/233 |
| 5,729,504 A | 3/1998 | Cowles | 365/236 |
| 5,742,792 A | 4/1998 | Yanai et al. | |
| 5,748,914 A | 5/1998 | Barth et al. | 395/285 |
| 5,752,045 A | 5/1998 | Chen | 395/750 |
| 5,757,703 A | 5/1998 | Merritt et al. | 365/189 |
| 5,760,478 A | 6/1998 | Bozso et al. | |
| 5,761,703 A | 6/1998 | Bolyn | 711/106 |
| 5,781,766 A | 7/1998 | Davis | 395/552 |
| 5,787,457 A | 7/1998 | Miller et al. | |
| 5,798,961 A | 8/1998 | Heyden et al. | 365/52 |
| 5,802,010 A | 9/1998 | Zagar et al. | 365/233 |
| 5,802,395 A | 9/1998 | Connolly et al. | |
| 5,802,555 A | 9/1998 | Shigeeda | 711/106 |
| 5,812,488 A | 9/1998 | Zagar et al. | 365/233 |
| 5,831,833 A | 11/1998 | Shirakawa et al. | |
| 5,831,931 A | 11/1998 | Manning | 365/233 |
| 5,831,932 A | 11/1998 | Merritt et al. | 365/233 |
| 5,834,838 A | 11/1998 | Anderson | 257/697 |
| 5,835,435 A | 11/1998 | Bogin et al. | 365/22 |
| 5,838,165 A | 11/1998 | Chatter | |
| 5,838,177 A | 11/1998 | Keeth | 327/108 |
| 5,841,580 A | 11/1998 | Farmwald et al. | 365/194 |
| 5,843,799 A | 12/1998 | Hsu et al. | 438/6 |
| 5,843,807 A | 12/1998 | Burns | 438/109 |
| 5,845,108 A | 12/1998 | Yoo et al. | 395/551 |
| 5,850,368 A | 12/1998 | Ong et al. | 365/238 |
| 5,859,792 A | 1/1999 | Rondeau et al. | 365/52 |
| 5,860,106 A | 1/1999 | Domen et al. | 711/137 |
| 5,870,347 A | 2/1999 | Keeth et al. | 365/230 |
| 5,870,350 A | 2/1999 | Bertin et al. | |
| 5,872,907 A | 2/1999 | Griess et al. | |
| 5,875,142 A | 2/1999 | Chevallier | 365/212 |
| 5,878,279 A | 3/1999 | Athenes | |
| 5,884,088 A | 3/1999 | Kardach et al. | 395/750.06 |
| 5,901,105 A | 5/1999 | Ong et al. | 365/230.06 |
| 5,903,500 A | 5/1999 | Tsang et al. | 365/189.05 |
| 5,905,688 A | 5/1999 | Park | 365/227 |
| 5,907,512 A | 5/1999 | Parkinson et al. | 365/195 |
| 5,915,105 A | 6/1999 | Farmwald et al. | 395/309 |
| 5,915,167 A | 6/1999 | Leedy | |
| 5,917,758 A | 6/1999 | Keeth | 365/189.05 |
| 5,923,611 A | 7/1999 | Ryan | 365/233 |
| 5,924,111 A | 7/1999 | Huang et al. | |
| 5,926,435 A | 7/1999 | Park et al. | 365/233 |
| 5,929,650 A | 7/1999 | Pappert et al. | 324/763 |
| 5,943,254 A | 8/1999 | Bakeman, Jr. et al. | 365/72 |
| 5,946,265 A | 8/1999 | Cowles | 365/233 |
| 5,949,254 A | 9/1999 | Keeth | 326/87 |
| 5,953,215 A | 9/1999 | Karabatsos | 361/767 |
| 5,953,263 A | 9/1999 | Farmwald et al. | 365/194 |
| 5,954,804 A | 9/1999 | Farmwald et al. | 710/36 |
| 5,956,233 A | 9/1999 | Yew et al. | 361/760 |
| 5,962,435 A | 10/1999 | Mao et al. | 514/63 |
| 5,963,429 A | 10/1999 | Chen | |
| 5,963,463 A | 10/1999 | Rondeau et al. | 365/52 |
| 5,963,464 A | 10/1999 | Dell et al. | 365/52 |
| 5,963,504 A | 10/1999 | Manning | 365/233 |
| 5,966,724 A | 10/1999 | Ryan | 711/105 |
| 5,966,727 A | 10/1999 | Nishino | 711/127 |
| 5,969,996 A | 10/1999 | Muranaka et al. | 365/189.01 |
| 5,973,392 A | 10/1999 | Senba et al. | 257/686 |
| 5,995,424 A | 11/1999 | Lawrence et al. | |
| 5,995,443 A | 11/1999 | Farmwald et al. | 365/233 |
| 6,001,671 A | 12/1999 | Fjelstad | 438/112 |
| 6,002,613 A | 12/1999 | Cloud et al. | 365/189 |
| 6,002,627 A | 12/1999 | Chevallier | 365/212 |
| 6,014,339 A | 1/2000 | Kobayashi et al. | 365/233 |
| 6,016,282 A | 1/2000 | Keeth | 365/233 |
| 6,026,050 A | 2/2000 | Baker et al. | 365/233 |
| 6,029,250 A | 2/2000 | Keeth | 713/400 |
| 6,032,214 A | 2/2000 | Farmwald et al. | 710/129 |
| 6,032,215 A | 2/2000 | Farmwald et al. | 710/129 |
| 6,034,916 A | 3/2000 | Lee | 365/233 |
| 6,034,918 A | 3/2000 | Farmwald et al. | 365/233 |
| 6,035,365 A | 3/2000 | Farmwald et al. | 710/129 |
| 6,038,195 A | 3/2000 | Farmwald et al. | 365/233 |
| 6,038,673 A | 3/2000 | Benn et al. | 713/323 |
| 6,044,032 A | 3/2000 | Li | 365/230 |
| 6,047,073 A | 4/2000 | Norris et al. | |
| 6,047,344 A | 4/2000 | Kawasumi et al. | 710/107 |
| 6,053,948 A | 4/2000 | Vaidyanathan et al. | 703/14 |
| 6,069,504 A | 5/2000 | Keeth | 327/108 |
| 6,070,217 A | 5/2000 | Connolly et al. | 710/131 |

| Patent No. | Date | Inventor | Class |
|---|---|---|---|
| 6,073,223 A | 6/2000 | McAllister et al. | 711/167 |
| 6,075,730 A | 6/2000 | Barth et al. | 365/191 |
| 6,075,744 A | 6/2000 | Tsern et al. | 365/230 |
| 6,078,546 A | 6/2000 | Lee | 365/233 |
| 6,079,025 A | 6/2000 | Fung | 713/323 |
| 6,084,434 A | 7/2000 | Keeth | 326/87 |
| 6,088,290 A | 7/2000 | Ohtake et al. | 365/233 |
| 6,091,251 A | 7/2000 | Wood et al. | 324/755 |
| RE36,839 E | 8/2000 | Simmons et al. | 326/93 |
| 6,101,152 A | 8/2000 | Farmwald et al. | 365/233 |
| 6,101,564 A | 8/2000 | Athenes et al. | |
| 6,101,612 A | 8/2000 | Jeddeloh | 713/401 |
| 6,108,795 A | 8/2000 | Jeddeloh | 713/401 |
| 6,111,812 A | 8/2000 | Gans et al. | 365/233 |
| 6,134,638 A | 10/2000 | Olarig et al. | 711/167 |
| 6,154,370 A | 11/2000 | Degani et al. | 361/761 |
| 6,166,991 A | 12/2000 | Phelan | 365/233 |
| 6,182,184 B1 | 1/2001 | Farmwald et al. | 710/129 |
| 6,199,151 B1 | 3/2001 | Williams et al. | |
| 6,208,168 B1 | 3/2001 | Rhee | 326/83 |
| 6,216,246 B1 | 4/2001 | Shau | 714/763 |
| 6,222,739 B1 | 4/2001 | Bhakta et al. | 361/790 |
| 6,226,709 B1 | 5/2001 | Goodwin et al. | |
| 6,233,192 B1 | 5/2001 | Tanaka | 365/222 |
| 6,233,650 B1 | 5/2001 | Johnson et al. | |
| 6,240,048 B1 | 5/2001 | Matsubara | 365/233 |
| 6,243,282 B1 | 6/2001 | Rondeau et al. | 365/52 |
| 6,252,807 B1 | 6/2001 | Suzuki et al. | 365/193 |
| 6,260,097 B1 | 7/2001 | Farmwald et al. | 710/129 |
| 6,260,154 B1 | 7/2001 | Jeddeloh | 713/401 |
| 6,262,938 B1 | 7/2001 | Lee et al. | 365/233 |
| 6,266,285 B1 | 7/2001 | Farmwald et al. | 365/194 |
| 6,266,292 B1 | 7/2001 | Tsern et al. | 365/230 |
| 6,274,395 B1 | 8/2001 | Weber | 438/14 |
| 6,279,069 B1 | 8/2001 | Robinson et al. | 711/103 |
| 6,295,572 B1 | 9/2001 | Wu | 710/131 |
| 6,298,426 B1 | 10/2001 | Ajanovic | 711/172 |
| 6,304,511 B1 | 10/2001 | Gans et al. | 365/233 |
| 6,307,769 B1 | 10/2001 | Nuxoll et al. | 365/63 |
| 6,314,051 B1 | 11/2001 | Farmwald et al. | 365/233 |
| 6,317,352 B1 | 11/2001 | Halbert et al. | 365/52 |
| 6,317,381 B1 | 11/2001 | Gans et al. | 365/233 |
| 6,324,120 B2 | 11/2001 | Farmwald et al. | 365/233 |
| 6,326,810 B1 | 12/2001 | Keeth | 326/83 |
| 6,327,664 B1 | 12/2001 | Dell et al. | 713/323 |
| 6,330,683 B1 | 12/2001 | Jeddeloh | 713/401 |
| 6,336,174 B1 | 1/2002 | Li et al. | |
| 6,338,108 B1 | 1/2002 | Motomura | 710/110 |
| 6,338,113 B1 | 1/2002 | Kubo et al. | 711/105 |
| 6,341,347 B1 | 1/2002 | Joy et al. | 712/228 |
| 6,343,042 B1 | 1/2002 | Tsern et al. | 365/222 |
| 6,353,561 B1 | 3/2002 | Funyu et al. | 365/195 |
| 6,356,105 B1 | 3/2002 | Volk | 326/30 |
| 6,356,500 B1 | 3/2002 | Cloud et al. | 365/226 |
| 6,362,656 B2 | 3/2002 | Rhee | 326/87 |
| 6,363,031 B2 | 3/2002 | Phelan | 365/233 |
| 6,378,020 B2 | 4/2002 | Farmwald et al. | 710/129 |
| 6,381,188 B1 | 4/2002 | Choi et al. | 365/222 |
| 6,381,668 B1 | 4/2002 | Lunteren | 711/5 |
| 6,389,514 B1 | 5/2002 | Rokicki | |
| 6,392,304 B1 | 5/2002 | Butler | 257/777 |
| 6,414,868 B1 | 7/2002 | Wong et al. | |
| 6,418,034 B1 | 7/2002 | Weber et al. | 361/790 |
| 6,421,754 B1 | 7/2002 | Kau et al. | |
| 6,424,532 B2 | 7/2002 | Kawamura | |
| 6,426,916 B2 | 7/2002 | Farmwald et al. | 365/233 |
| 6,429,029 B1 | 8/2002 | Eldridge et al. | 438/14 |
| 6,430,103 B2 | 8/2002 | Nakayama et al. | 365/230.03 |
| 6,437,600 B1 | 8/2002 | Keeth | 326/86 |
| 6,438,057 B1 | 8/2002 | Ruckerbauer | 365/222 |
| 6,442,698 B2 | 8/2002 | Nizar | 713/320 |
| 6,445,591 B1 | 9/2002 | Kwong | |
| 6,452,826 B1 | 9/2002 | Kim et al. | 365/51 |
| 6,452,863 B2 | 9/2002 | Farmwald et al. | 365/233 |
| 6,453,400 B1 | 9/2002 | Maesako et al. | 711/167 |
| 6,453,402 B1 | 9/2002 | Jeddeloh | 711/167 |
| 6,453,434 B2 | 9/2002 | Delp et al. | |
| 6,455,348 B1 | 9/2002 | Yamaguchi | |
| 6,457,095 B1 | 9/2002 | Volk | 711/105 |
| 6,459,651 B1 | 10/2002 | Lee et al. | 365/233 |
| 6,473,831 B1 | 10/2002 | Schade | 711/115 |
| 6,476,476 B1 | 11/2002 | Glenn | |
| 6,480,929 B1 | 11/2002 | Gauthier et al. | 711/105 |
| 6,487,102 B1 | 11/2002 | Halbert et al. | 365/51 |
| 6,489,669 B2 | 12/2002 | Shimada et al. | 257/686 |
| 6,490,161 B1 | 12/2002 | Johnson | |
| 6,493,789 B2 | 12/2002 | Ware et al. | 711/105 |
| 6,496,440 B2 | 12/2002 | Manning | 365/230.03 |
| 6,496,897 B2 | 12/2002 | Ware et al. | 711/105 |
| 6,498,766 B2 | 12/2002 | Lee et al. | 365/233 |
| 6,510,097 B2 | 1/2003 | Fukuyama | 365/230.03 |
| 6,510,503 B2 | 1/2003 | Gillingham et al. | 711/167 |
| 6,512,392 B2 | 1/2003 | Fleury et al. | 324/765 |
| 6,521,984 B2 | 2/2003 | Matsuura | 257/768 |
| 6,526,471 B1 | 2/2003 | Shimomura et al. | 711/5 |
| 6,526,473 B1 | 2/2003 | Kim | |
| 6,526,484 B1 | 2/2003 | Stacovsky et al. | 711/158 |
| 6,545,895 B1 | 4/2003 | Li et al. | 365/52 |
| 6,546,446 B2 | 4/2003 | Farmwald et al. | 710/305 |
| 6,553,450 B1 | 4/2003 | Dodd et al. | 711/105 |
| 6,560,158 B2 | 5/2003 | Choi et al. | 365/226 |
| 6,563,337 B2 | 5/2003 | Dour | 326/30 |
| 6,563,759 B2 | 5/2003 | Yahata et al. | 365/233 |
| 6,564,281 B2 | 5/2003 | Farmwald et al. | 710/305 |
| 6,564,285 B1 | 5/2003 | Mills et al. | 711/103 |
| 6,574,150 B2 | 6/2003 | Suyama et al. | 365/189.05 |
| 6,584,037 B2 | 6/2003 | Farmwald et al. | 365/233 |
| 6,587,912 B2 | 7/2003 | Leddige et al. | 711/5 |
| 6,590,822 B2 | 7/2003 | Hwang et al. | 365/222 |
| 6,594,770 B1 | 7/2003 | Sato et al. | 713/320 |
| 6,597,616 B2 | 7/2003 | Tsern et al. | 365/222 |
| 6,597,617 B2 | 7/2003 | Ooishi et al. | 365/222 |
| 6,614,700 B2 | 9/2003 | Dietrich et al. | 365/194 |
| 6,618,267 B1 | 9/2003 | Dalal et al. | |
| 6,618,791 B1 | 9/2003 | Dodd et al. | 711/105 |
| 6,621,760 B1 | 9/2003 | Ahmad et al. | 365/233 |
| 6,630,729 B2 | 10/2003 | Huang | 257/676 |
| 6,631,086 B1 | 10/2003 | Bill et al. | 365/185.09 |
| 6,639,820 B1 | 10/2003 | Khandekar et al. | 365/63 |
| 6,646,939 B2 | 11/2003 | Kwak | 365/219 |
| 6,650,588 B2 | 11/2003 | Yamagata | 365/222 |
| 6,650,594 B1 | 11/2003 | Lee et al. | 365/233 |
| 6,657,634 B1 | 12/2003 | Sinclair et al. | 345/534 |
| 6,657,918 B2 | 12/2003 | Foss et al. | 365/233 |
| 6,657,919 B2 | 12/2003 | Foss et al. | 365/233 |
| 6,658,016 B1 | 12/2003 | Dai et al. | |
| 6,658,530 B1 | 12/2003 | Robertson et al. | 711/115 |
| 6,659,512 B1 | 12/2003 | Harper et al. | |
| 6,664,625 B2 | 12/2003 | Hiruma | |
| 6,665,224 B1 | 12/2003 | Lehmann et al. | 365/222 |
| 6,665,227 B2 | 12/2003 | Fetzer | 365/229 |
| 6,668,242 B1 | 12/2003 | Reynov et al. | |
| 6,674,154 B2 | 1/2004 | Minamio et al. | |
| 6,683,372 B1 | 1/2004 | Wong et al. | 257/686 |
| 6,684,292 B2 | 1/2004 | Piccirillo et al. | |
| 6,697,295 B2 | 2/2004 | Farmwald et al. | 365/233 |
| 6,701,446 B2 | 3/2004 | Tsern et al. | 713/501 |
| 6,705,877 B1 | 3/2004 | Li et al. | 439/74 |
| 6,708,144 B1 | 3/2004 | Merryman et al. | 703/14 |
| 6,710,430 B2 | 3/2004 | Minamio et al. | |
| 6,711,043 B2 | 3/2004 | Friedman et al. | |
| 6,713,856 B2 | 3/2004 | Tsai et al. | |
| 6,714,891 B2 | 3/2004 | Dendinger | 702/132 |
| 6,724,684 B2 | 4/2004 | Kim | 365/233 |
| 6,731,527 B2 | 5/2004 | Brown | 365/63 |
| 6,742,098 B1 | 5/2004 | Halbert et al. | |
| 6,744,687 B2 | 6/2004 | Koo et al. | 365/226 |
| 6,747,887 B2 | 6/2004 | Halbert et al. | 365/51 |
| 6,751,113 B2 | 6/2004 | Bhakta et al. | 365/63 |
| 6,751,696 B2 | 6/2004 | Farmwald et al. | 710/305 |
| 6,754,129 B2 | 6/2004 | Khatri et al. | 365/226 |
| 6,754,132 B2 | 6/2004 | Kyung | 365/233 |
| 6,757,751 B1 | 6/2004 | Gene | 710/36 |
| 6,762,948 B2 | 7/2004 | Kyun et al. | 365/51 |
| 6,765,812 B2 | 7/2004 | Anderson | 365/51 |
| 6,766,469 B2 | 7/2004 | Larson et al. | |
| 6,771,526 B2 | 8/2004 | LaBerge | 365/63 |
| 6,772,359 B2 | 8/2004 | Kwak et al. | 713/500 |

| Patent No. | Date | Inventor(s) | Class |
|---|---|---|---|
| 6,779,097 B2 | 8/2004 | Gillingham et al. | 711/167 |
| 6,785,767 B2 | 8/2004 | Coulson | 711/112 |
| 6,791,877 B2 | 9/2004 | Miura et al. | 365/185 |
| 6,795,899 B2 | 9/2004 | Dodd et al. | 711/137 |
| 6,799,241 B2 | 9/2004 | Kahn et al. | 711/105 |
| 6,801,989 B2 | 10/2004 | Johnson et al. | 711/167 |
| 6,807,598 B2 | 10/2004 | Farmwald et al. | 710/305 |
| 6,807,655 B1 | 10/2004 | Rehani et al. | 716/4 |
| 6,816,991 B2 | 11/2004 | Sanghani | 714/733 |
| 6,819,602 B2 | 11/2004 | Seo et al. | 365/193 |
| 6,819,617 B2 | 11/2004 | Hwang et al. | 365/222 |
| 6,820,163 B1 | 11/2004 | McCall et al. | 710/310 |
| 6,820,169 B2 | 11/2004 | Wilcox et al. | 711/105 |
| 6,826,104 B2 | 11/2004 | Kawaguchi et al. | 365/222 |
| 6,839,290 B2 | 1/2005 | Ahmad et al. | 365/193 |
| 6,845,027 B2 | 1/2005 | Mayer et al. | |
| 6,845,055 B1 | 1/2005 | Koga et al. | 365/229 |
| 6,847,582 B2 | 1/2005 | Pan | 365/233 |
| 6,850,449 B2 | 2/2005 | Takahashi | 365/222 |
| 6,862,202 B2 | 3/2005 | Schaefer | 365/52 |
| 6,862,249 B2 | 3/2005 | Kyung | 365/233 |
| 6,862,653 B1 | 3/2005 | Dodd et al. | 711/105 |
| 6,873,534 B2 | 3/2005 | Bhakta et al. | 365/63 |
| 6,878,570 B2 | 4/2005 | Lyu et al. | 438/106 |
| 6,894,933 B2 | 5/2005 | Kuzmenka et al. | 365/189.05 |
| 6,898,683 B2 | 5/2005 | Nakamura | 711/167 |
| 6,908,314 B2 | 6/2005 | Brown | 439/68 |
| 6,912,778 B2 | 7/2005 | Ahn et al. | 29/852 |
| 6,914,786 B1 | 7/2005 | Paulsen et al. | |
| 6,917,219 B2 | 7/2005 | New | 326/41 |
| 6,922,371 B2 | 7/2005 | Takahashi et al. | 365/227 |
| 6,930,900 B2 | 8/2005 | Bhakta et al. | 365/51 |
| 6,930,903 B2 | 8/2005 | Bhakta et al. | 365/63 |
| 6,938,119 B2 | 8/2005 | Kohn et al. | 711/105 |
| 6,943,450 B2 | 9/2005 | Fee et al. | 257/773 |
| 6,944,748 B2 | 9/2005 | Sanches et al. | |
| 6,947,341 B2 | 9/2005 | Stubbs et al. | |
| 6,951,982 B2 | 10/2005 | Chye et al. | 174/52 |
| 6,952,794 B2 | 10/2005 | Lu | |
| 6,961,281 B2 | 11/2005 | Wong et al. | 365/230.03 |
| 6,968,416 B2 | 11/2005 | Moy | 710/310 |
| 6,968,419 B1 | 11/2005 | Holman | 711/5 |
| 6,970,968 B1 | 11/2005 | Holman | 711/5 |
| 6,980,021 B1 | 12/2005 | Srivastava et al. | 326/30 |
| 6,986,118 B2 | 1/2006 | Dickman | 716/8 |
| 6,992,501 B2 | 1/2006 | Rapport | 326/30 |
| 6,992,950 B2 | 1/2006 | Foss et al. | 365/233 |
| 7,000,062 B2 | 2/2006 | Perego et al. | 711/5 |
| 7,003,618 B2 | 2/2006 | Perego et al. | 711/5 |
| 7,003,639 B2 | 2/2006 | Tsern et al. | 711/154 |
| 7,007,095 B2 | 2/2006 | Chen et al. | |
| 7,007,175 B2 | 2/2006 | Chang et al. | 713/300 |
| 7,010,642 B2 | 3/2006 | Perego et al. | 711/5 |
| 7,010,736 B1 | 3/2006 | Teh et al. | 714/733 |
| 7,024,518 B2 | 4/2006 | Halbert et al. | 711/115 |
| 7,026,708 B2 | 4/2006 | Caty et al. | 257/686 |
| 7,028,215 B2 | 4/2006 | Depew et al. | |
| 7,028,234 B2 | 4/2006 | Huckaby et al. | 714/710 |
| 7,033,861 B1 | 4/2006 | Partridge et al. | 438/109 |
| 7,035,150 B2 | 4/2006 | Streif et al. | 365/194 |
| 7,043,599 B1 | 5/2006 | Ware et al. | 711/106 |
| 7,045,396 B2 | 5/2006 | Crowley et al. | 438/123 |
| 7,045,901 B2 | 5/2006 | Lin et al. | 257/778 |
| 7,046,538 B2 | 5/2006 | Kinsley et al. | 365/52 |
| 7,053,470 B1 | 5/2006 | Sellers et al. | 257/768 |
| 7,053,478 B2 | 5/2006 | Roper et al. | 257/686 |
| 7,058,776 B2 | 6/2006 | Lee | 711/154 |
| 7,058,863 B2 | 6/2006 | Kouchi et al. | 714/718 |
| 7,061,784 B2 | 6/2006 | Jakobs et al. | 365/51 |
| 7,061,823 B2 | 6/2006 | Faue et al. | 365/230.08 |
| 7,066,741 B2 | 6/2006 | Burns et al. | 439/69 |
| 7,075,175 B2 | 7/2006 | Kazi et al. | 257/678 |
| 7,079,396 B2 | 7/2006 | Gates et al. | |
| 7,079,441 B1 | 7/2006 | Partsch et al. | 365/226 |
| 7,079,446 B2 | 7/2006 | Murtagh et al. | 365/233 |
| 7,085,152 B2 | 8/2006 | Ellis et al. | 365/149 |
| 7,085,941 B2 | 8/2006 | Li | 713/300 |
| 7,089,438 B2 | 8/2006 | Raad | 713/322 |
| 7,093,101 B2 | 8/2006 | Aasheim et al. | 711/207 |
| 7,103,730 B2 | 9/2006 | Saxena et al. | 711/156 |
| 7,119,428 B2 | 10/2006 | Tanie et al. | |
| 7,120,727 B2 | 10/2006 | Lee et al. | 711/5 |
| 7,126,399 B1 | 10/2006 | Lee | 327/261 |
| 7,127,567 B2 | 10/2006 | Ramakrishnan et al. | |
| 7,133,960 B1 | 11/2006 | Thompson et al. | |
| 7,136,978 B2 | 11/2006 | Miura et al. | 711/165 |
| 7,149,145 B2 | 12/2006 | Kim et al. | 365/233 |
| 7,149,824 B2 | 12/2006 | Johnson | 710/35 |
| 7,173,863 B2 | 2/2007 | Conley et al. | 365/189 |
| 7,200,021 B2 | 4/2007 | Raghuram | 365/51 |
| 7,205,789 B1 | 4/2007 | Karabatsos | 326/30 |
| 7,210,059 B2 | 4/2007 | Jeddeloh | |
| 7,215,561 B2 | 5/2007 | Park et al. | |
| 7,218,566 B1 | 5/2007 | Totolos, Jr. et al. | |
| 7,224,595 B2 | 5/2007 | Dreps et al. | 365/63 |
| 7,228,264 B2 | 6/2007 | Banrenscheen et al. | 703/23 |
| 7,231,562 B2 | 6/2007 | Ohlhoff et al. | |
| 7,233,541 B2 | 6/2007 | Yamamoto et al. | 365/230.03 |
| 7,234,081 B2 | 6/2007 | Nguyen et al. | |
| 7,243,185 B2 | 7/2007 | See et al. | |
| 7,245,541 B2 | 7/2007 | Janzen | 365/198 |
| 7,254,036 B2 | 8/2007 | Pauley et al. | 361/721 |
| 7,266,639 B2 | 9/2007 | Raghuram | 711/115 |
| 7,269,042 B2 | 9/2007 | Kinsley et al. | 365/52 |
| 7,269,708 B2 | 9/2007 | Ware | 711/203 |
| 7,274,583 B2 | 9/2007 | Park et al. | |
| 7,277,333 B2 | 10/2007 | Schaefer | |
| 7,286,436 B2 | 10/2007 | Bhakta et al. | 365/230 |
| 7,289,386 B2 | 10/2007 | Bhakta et al | 365/230 |
| 7,296,754 B2 * | 11/2007 | Nishizawa et al. | 235/492 |
| 7,299,330 B2 | 11/2007 | Gillingham et al. | 711/167 |
| 7,302,598 B2 | 11/2007 | Suzuki et al. | |
| 7,307,863 B2 | 12/2007 | Yen et al. | 365/63 |
| 7,317,250 B2 | 1/2008 | Koh et al. | |
| 7,363,422 B2 | 4/2008 | Perego et al. | 711/105 |
| 7,366,947 B2 | 4/2008 | Gower et al. | |
| 7,379,316 B2 | 5/2008 | Rajan | 365/63 |
| 7,386,656 B2 | 6/2008 | Rajan et al. | 711/103 |
| 7,392,338 B2 | 6/2008 | Rajan et al. | 711/103 |
| 7,408,393 B1 | 8/2008 | Jain et al. | 327/202 |
| 7,409,492 B2 * | 8/2008 | Tanaka et al. | 711/103 |
| 7,414,917 B2 | 8/2008 | Ruckerbauer et al. | |
| 7,428,644 B2 | 9/2008 | Jeddeloh et al. | |
| 7,437,579 B2 | 10/2008 | Jeddeloh et al. | 713/300 |
| 7,441,064 B2 | 10/2008 | Gaskins | |
| 7,457,122 B2 | 11/2008 | Lai et al. | |
| 7,464,225 B2 | 12/2008 | Tsern | 711/115 |
| 7,472,220 B2 | 12/2008 | Rajan et al. | 711/103 |
| 7,474,576 B2 | 1/2009 | Co et al. | |
| 7,480,147 B2 | 1/2009 | Hoss et al. | |
| 7,480,774 B2 | 1/2009 | Ellis et al. | |
| 7,496,777 B2 | 2/2009 | Kapil | 713/324 |
| 7,515,453 B2 | 4/2009 | Rajan | 365/63 |
| 7,532,537 B2 | 5/2009 | Solomon et al. | 365/230 |
| 7,539,800 B2 | 5/2009 | Dell et al. | |
| 7,573,136 B2 | 8/2009 | Jiang et al. | |
| 7,580,312 B2 | 8/2009 | Rajan et al. | |
| 7,581,121 B2 | 8/2009 | Barth et al. | |
| 7,581,127 B2 | 8/2009 | Rajan et al. | |
| 7,590,796 B2 | 9/2009 | Rajan et al. | |
| 7,599,205 B2 | 10/2009 | Rajan | |
| 7,606,245 B2 | 10/2009 | Ma et al. | |
| 7,609,567 B2 | 10/2009 | Rajan et al. | |
| 7,613,880 B2 | 11/2009 | Miura et al. | |
| 7,619,912 B2 | 11/2009 | Bhakta et al. | |
| 7,724,589 B2 | 5/2010 | Rajan et al. | |
| 7,730,338 B2 | 6/2010 | Rajan et al. | |
| 7,761,724 B2 | 7/2010 | Rajan et al. | |
| 2001/0000822 A1 | 5/2001 | Dell et al. | 711/170 |
| 2001/0003198 A1 | 6/2001 | Wu | |
| 2001/0011322 A1 | 8/2001 | Stolt et al. | |
| 2001/0021106 A1 | 9/2001 | Weber et al. | 361/790 |
| 2001/0021137 A1 | 9/2001 | Kai et al. | 365/222 |
| 2001/0046129 A1 | 11/2001 | Broglia et al. | |
| 2001/0046163 A1 | 11/2001 | Yanagawa | |
| 2002/0002662 A1 | 1/2002 | Olarig et al. | |
| 2002/0004897 A1 | 1/2002 | Kao et al. | |
| 2002/0015340 A1 | 2/2002 | Batinovich | |

| | | | | | | |
|---|---|---|---|---|---|---|
| 2002/0019961 A1 | 2/2002 | Blodgett ............... 714/718 | | 2004/0133736 A1 | 7/2004 | Kyung ............... 711/105 |
| 2002/0034068 A1 | 3/2002 | Weber et al. ............... 361/790 | | 2004/0139359 A1 | 7/2004 | Samson et al. ............... 713/320 |
| 2002/0038405 A1 | 3/2002 | Leddige et al. ............... 711/115 | | 2004/0145963 A1 | 7/2004 | Byon ............... 365/233 |
| 2002/0041507 A1 | 4/2002 | Woo et al. ............... 365/51 | | 2004/0151038 A1 | 8/2004 | Ruckerbauer et al. ............... 365/200 |
| 2002/0051398 A1 | 5/2002 | Mizugaki ............... 365/222 | | 2004/0174765 A1 | 9/2004 | Seo et al. ............... 365/233 |
| 2002/0060945 A1 | 5/2002 | Ikeda | | 2004/0177079 A1 | 9/2004 | Gluhovsky et al. ............... 707/100 |
| 2002/0064073 A1 | 5/2002 | Chien ............... 365/200 | | 2004/0178824 A1 | 9/2004 | Pan ............... 326/93 |
| 2002/0064083 A1 | 5/2002 | Ryu et al. ............... 365/233 | | 2004/0184324 A1 | 9/2004 | Pax ............... 365/189.12 |
| 2002/0089831 A1 | 7/2002 | Forthun ............... 361/760 | | 2004/0186956 A1 | 9/2004 | Perego et al. ............... 711/115 |
| 2002/0089970 A1 | 7/2002 | Asada et al. | | 2004/0188704 A1 | 9/2004 | Halbert et al. ............... 257/145 |
| 2002/0094671 A1 | 7/2002 | Distefano et al. | | 2004/0196732 A1 | 10/2004 | Lee ............... 365/233 |
| 2002/0121650 A1 | 9/2002 | Minamio et al. | | 2004/0205433 A1 | 10/2004 | Gower et al. |
| 2002/0121670 A1 | 9/2002 | Minamio et al. | | 2004/0208173 A1 | 10/2004 | Di Gregorio ............... 370/360 |
| 2002/0124195 A1 | 9/2002 | Nizar ............... 713/320 | | 2004/0225858 A1 | 11/2004 | Brueggen |
| 2002/0129204 A1 | 9/2002 | Leighnor et al. | | 2004/0228166 A1 | 11/2004 | Braun et al. ............... 365/154 |
| 2002/0145900 A1 | 10/2002 | Schaefer ............... 365/52 | | 2004/0228196 A1 | 11/2004 | Kwak et al. |
| 2002/0165706 A1 | 11/2002 | Raynham ............... 703/25 | | 2004/0228203 A1 | 11/2004 | Koo ............... 365/233 |
| 2002/0167092 A1 | 11/2002 | Fee et al. | | 2004/0230932 A1 | 11/2004 | Dickmann ............... 716/10 |
| 2002/0172024 A1 | 11/2002 | Hui et al. | | 2004/0236877 A1 | 11/2004 | Burton |
| 2002/0174274 A1 | 11/2002 | Wu et al. ............... 710/100 | | 2004/0250989 A1 | 12/2004 | Im et al. |
| 2002/0184438 A1 | 12/2002 | Usui ............... 711/106 | | 2004/0256638 A1 | 12/2004 | Perego et al. ............... 257/200 |
| 2003/0002262 A1 | 1/2003 | Benisek et al. ............... 361/728 | | 2004/0257847 A1 | 12/2004 | Matsui et al. ............... 365/63 |
| 2003/0011993 A1 | 1/2003 | Summers et al. | | 2004/0260957 A1 | 12/2004 | Jeddeloh et al. ............... 713/300 |
| 2003/0016550 A1 | 1/2003 | Yoo et al. | | 2004/0264255 A1 | 12/2004 | Royer ............... 365/189.01 |
| 2003/0021175 A1 | 1/2003 | Tae Kwak ............... 365/219 | | 2004/0268161 A1 | 12/2004 | Ross ............... 713/300 |
| 2003/0026155 A1 | 2/2003 | Yamagata | | 2005/0018495 A1 | 1/2005 | Bhakta et al. ............... 365/19 |
| 2003/0026159 A1 | 2/2003 | Frankowsky et al. | | 2005/0021874 A1 | 1/2005 | Georgiou et al. ............... 709/250 |
| 2003/0035312 A1 | 2/2003 | Halbert et al. ............... 365/51 | | 2005/0024963 A1 | 2/2005 | Jakobs et al. ............... 365/202 |
| 2003/0039158 A1 | 2/2003 | Horiguchi et al. ............... 365/200 | | 2005/0027928 A1* | 2/2005 | Avraham et al. ............... 711/103 |
| 2003/0041295 A1 | 2/2003 | Hou et al. | | 2005/0028038 A1 | 2/2005 | Pomaranski et al. ............... 714/42 |
| 2003/0061458 A1 | 3/2003 | Wilcox et al. ............... 711/167 | | 2005/0034004 A1 | 2/2005 | Bunker et al. |
| 2003/0061459 A1 | 3/2003 | Aboulenein et al. | | 2005/0036350 A1 | 2/2005 | So et al. ............... 365/63 |
| 2003/0093614 A1 | 5/2003 | Kohn et al. ............... 711/105 | | 2005/0041504 A1 | 2/2005 | Perego et al. ............... 365/222 |
| 2003/0101392 A1 | 5/2003 | Lee ............... 714/718 | | 2005/0044303 A1 | 2/2005 | Perego et al. ............... 711/5 |
| 2003/0105932 A1 | 6/2003 | David et al. ............... 711/167 | | 2005/0044305 A1 | 2/2005 | Jakobs et al. ............... 711/105 |
| 2003/0117875 A1 | 6/2003 | Lee et al. ............... 365/226 | | 2005/0047192 A1 | 3/2005 | Matsui et al. ............... 365/145 |
| 2003/0123389 A1 | 7/2003 | Russell et al. | | 2005/0071543 A1 | 3/2005 | Ellis et al. ............... 711/106 |
| 2003/0126338 A1 | 7/2003 | Dodd et al. ............... 710/305 | | 2005/0078532 A1 | 4/2005 | Ruckerbauer et al. ............... 365/199 |
| 2003/0127737 A1 | 7/2003 | Takahashi | | 2005/0081085 A1 | 4/2005 | Ellis et al. ............... 714/5 |
| 2003/0131160 A1 | 7/2003 | Hampel et al. ............... 710/22 | | 2005/0099834 A1 | 5/2005 | Funaba et al. ............... 365/63 |
| 2003/0145163 A1 | 7/2003 | Seo et al. ............... 711/106 | | 2005/0102590 A1 | 5/2005 | Norris et al. ............... 714/719 |
| 2003/0158995 A1 | 8/2003 | Lee et al. ............... 711/105 | | 2005/0105318 A1 | 5/2005 | Funaba et al. ............... 365/63 |
| 2003/0164539 A1 | 9/2003 | Yau ............... 257/686 | | 2005/0108460 A1 | 5/2005 | David |
| 2003/0164543 A1 | 9/2003 | Kheng Lee | | 2005/0127531 A1 | 6/2005 | Tay et al. |
| 2003/0182513 A1 | 9/2003 | Dodd et al. ............... 711/137 | | 2005/0132158 A1 | 6/2005 | Hampel et al. ............... 711/167 |
| 2003/0183934 A1 | 10/2003 | Barrett ............... 257/738 | | 2005/0135176 A1 | 6/2005 | Ramakrishnan et al. |
| 2003/0189868 A1 | 10/2003 | Riesenman et al. ............... 365/226 | | 2005/0138267 A1 | 6/2005 | Bains et al. ............... 711/100 |
| 2003/0189870 A1 | 10/2003 | Wilcox ............... 365/233 | | 2005/0138304 A1 | 6/2005 | Ramakrishnan et al. |
| 2003/0191888 A1 | 10/2003 | Klein ............... 711/105 | | 2005/0139977 A1 | 6/2005 | Nishio et al. ............... 257/686 |
| 2003/0191915 A1 | 10/2003 | Saxena et al. ............... 711/160 | | 2005/0141199 A1 | 6/2005 | Chiou et al. ............... 361/704 |
| 2003/0200382 A1 | 10/2003 | Wells et al. ............... 711/106 | | 2005/0149662 A1 | 7/2005 | Perego et al. ............... 711/5 |
| 2003/0200474 A1 | 10/2003 | Li ............... 713/320 | | 2005/0152212 A1 | 7/2005 | Yang et al. ............... 365/233 |
| 2003/0205802 A1 | 11/2003 | Segaram ............... 257/690 | | 2005/0156934 A1 | 7/2005 | Perego et al. ............... 345/531 |
| 2003/0206476 A1 | 11/2003 | Joo ............... 365/222 | | 2005/0166026 A1 | 7/2005 | Ware et al. ............... 711/167 |
| 2003/0217303 A1 | 11/2003 | Chua-Eoan et al. ............... 713/600 | | 2005/0193163 A1 | 9/2005 | Perego et al. ............... 711/105 |
| 2003/0223290 A1 | 12/2003 | Park et al. ............... 365/200 | | 2005/0194676 A1 | 9/2005 | Fukuda et al. |
| 2003/0227798 A1 | 12/2003 | Pax ............... 365/189.12 | | 2005/0194991 A1 | 9/2005 | Dour et al. ............... 326/30 |
| 2003/0229821 A1 | 12/2003 | Ma ............... 714/8 | | 2005/0195629 A1 | 9/2005 | Leddige et al. ............... 365/51 |
| 2003/0230801 A1 | 12/2003 | Jiang et al. | | 2005/0201063 A1 | 9/2005 | Lee et al. |
| 2003/0231540 A1 | 12/2003 | Lazar et al. ............... 365/222 | | 2005/0204111 A1 | 9/2005 | Natarajan ............... 711/167 |
| 2003/0231542 A1 | 12/2003 | Zaharinova-Papazova et al. ............... 365/226 | | 2005/0207255 A1 | 9/2005 | Perego et al. ............... 365/222 |
| 2003/0234664 A1 | 12/2003 | Yamagata | | 2005/0210196 A1 | 9/2005 | Perego et al. ............... 711/115 |
| 2004/0016994 A1 | 1/2004 | Huang | | 2005/0223179 A1 | 10/2005 | Perego et al. ............... 711/154 |
| 2004/0027902 A1 | 2/2004 | Ooishi et al. ............... 365/222 | | 2005/0224948 A1 | 10/2005 | Lee et al. ............... 257/686 |
| 2004/0034732 A1 | 2/2004 | Valin et al. ............... 711/4 | | 2005/0232049 A1 | 10/2005 | Park |
| 2004/0034755 A1 | 2/2004 | LaBerge et al. | | 2005/0235119 A1 | 10/2005 | Sechrest et al. ............... 711/158 |
| 2004/0037133 A1 | 2/2004 | Park et al. ............... 365/202 | | 2005/0235131 A1 | 10/2005 | Ware ............... 711/203 |
| 2004/0044808 A1 | 3/2004 | Salmon et al. ............... 710/8 | | 2005/0237838 A1 | 10/2005 | Kwak et al. ............... 365/222 |
| 2004/0047228 A1 | 3/2004 | Chen ............... 365/232 | | 2005/0243635 A1 | 11/2005 | Schaefer ............... 365/227 |
| 2004/0057317 A1 | 3/2004 | Schaefer ............... 365/222 | | 2005/0249011 A1 | 11/2005 | Maeda ............... 365/222 |
| 2004/0064647 A1 | 4/2004 | DeWhitt et al. ............... 711/135 | | 2005/0259504 A1 | 11/2005 | Murtugh et al. ............... 365/233 |
| 2004/0064767 A1 | 4/2004 | Huckaby et al. ............... 714/710 | | 2005/0263312 A1 | 12/2005 | Bolken et al. |
| 2004/0083324 A1 | 4/2004 | Rabinovitz et al. | | 2005/0265506 A1 | 12/2005 | Foss et al. ............... 375/376 |
| 2004/0088475 A1 | 5/2004 | Streif et al. ............... 711/105 | | 2005/0269715 A1 | 12/2005 | Yoo ............... 257/780 |
| 2004/0100837 A1 | 5/2004 | Lee | | 2005/0278474 A1 | 12/2005 | Perersen et al. ............... 711/5 |
| 2004/0117723 A1 | 6/2004 | Foss ............... 714/805 | | 2005/0281096 A1 | 12/2005 | Bhakta et al. |
| 2004/0123173 A1 | 6/2004 | Emberling et al. ............... 714/733 | | 2005/0281123 A1 | 12/2005 | Bell et al. ............... 365/230.08 |
| 2004/0125635 A1 | 7/2004 | Kuzmenka ............... 365/51 | | 2005/0283572 A1 | 12/2005 | Ishihara ............... 711/118 |
| | | | | 2005/0285174 A1 | 12/2005 | Saito et al. ............... 257/296 |

| | | | | | | |
|---|---|---|---|---|---|---|
| 2005/0289292 A1 | 12/2005 | Morrow et al. ............... 711/105 | | 2008/0027702 A1 | 1/2008 | Rajan et al. ................. 703/21 |
| 2005/0289317 A1 | 12/2005 | Liou et al. .................... 711/170 | | 2008/0027703 A1 | 1/2008 | Rajan et al. ................. 703/21 |
| 2006/0002201 A1 | 1/2006 | Janzen ......................... 365/191 | | 2008/0028135 A1 | 1/2008 | Rajan et al. |
| 2006/0010339 A1 | 1/2006 | Klein ............................... 714/5 | | 2008/0028136 A1 | 1/2008 | Schakel et al. ................ 711/106 |
| 2006/0026484 A1 | 2/2006 | Hollums ...................... 714/746 | | 2008/0028137 A1 | 1/2008 | Schakel et al. |
| 2006/0038597 A1 | 2/2006 | Becker et al. | | 2008/0031030 A1 | 2/2008 | Rajan et al. ................... 365/63 |
| 2006/0039204 A1 | 2/2006 | Cornelius | | 2008/0031072 A1 | 2/2008 | Rajan et al. .................. 365/227 |
| 2006/0039205 A1 | 2/2006 | Cornelius ................ 365/189.05 | | 2008/0037353 A1 | 2/2008 | Rajan et al. .................. 365/227 |
| 2006/0041711 A1 | 2/2006 | Miura et al. .................. 711/103 | | 2008/0056014 A1 | 3/2008 | Rajan et al. .............. 365/189.03 |
| 2006/0041730 A1 | 2/2006 | Larson .......................... 711/167 | | 2008/0062773 A1 | 3/2008 | Rajan et al. .............. 365/189.03 |
| 2006/0044909 A1 | 3/2006 | Kinsley et al. ............... 365/222 | | 2008/0065820 A1 | 3/2008 | Gillingham et al. .......... 711/105 |
| 2006/0044913 A1 | 3/2006 | Klein et al. .................. 365/222 | | 2008/0082763 A1 | 4/2008 | Rajan et al. .................. 711/154 |
| 2006/0049502 A1 | 3/2006 | Goodwin et al. ............. 257/686 | | 2008/0086588 A1 | 4/2008 | Danilak et al. |
| 2006/0050574 A1 | 3/2006 | Streif et al. .................. 365/194 | | 2008/0089034 A1 | 4/2008 | Hoss et al. |
| 2006/0056244 A1 | 3/2006 | Ware ............................ 365/194 | | 2008/0098277 A1 | 4/2008 | Hazelzet |
| 2006/0062047 A1 | 3/2006 | Bhakta et al. | | 2008/0103753 A1 | 5/2008 | Rajan et al. |
| 2006/0067141 A1 | 3/2006 | Perego et al. ................. 365/200 | | 2008/0104314 A1 | 5/2008 | Rajan et al. |
| 2006/0085616 A1 | 4/2006 | Zeighami et al. ............. 711/167 | | 2008/0109206 A1 | 5/2008 | Rajan et al. |
| 2006/0087900 A1 | 4/2006 | Bucksch et al. | | 2008/0109595 A1 | 5/2008 | Rajan et al. |
| 2006/0090031 A1 | 4/2006 | Kirshenbaum et al. ....... 711/113 | | 2008/0109597 A1 | 5/2008 | Schakel et al. |
| 2006/0090054 A1 | 4/2006 | Choi et al. .................... 711/167 | | 2008/0109598 A1 | 5/2008 | Schakel et al. |
| 2006/0106951 A1 | 5/2006 | Bains ................................ 710/5 | | 2008/0115006 A1 | 5/2008 | Smith et al. ................... 713/601 |
| 2006/0112214 A1 | 5/2006 | Yeh ............................... 711/103 | | 2008/0120443 A1 | 5/2008 | Rajan et al. |
| 2006/0112219 A1 | 5/2006 | Chawla et al. | | 2008/0120458 A1 | 5/2008 | Gillingham et al. .......... 711/105 |
| 2006/0117152 A1 | 6/2006 | Amidi et al. | | 2008/0123459 A1 | 5/2008 | Rajan et al. .................. 365/227 |
| 2006/0117160 A1 | 6/2006 | Jackson et al. ................ 711/170 | | 2008/0126687 A1 | 5/2008 | Rajan et al. |
| 2006/0118933 A1 | 6/2006 | Haba ............................. 257/678 | | 2008/0126688 A1 | 5/2008 | Rajan et al. |
| 2006/0120193 A1 | 6/2006 | Casper .......................... 365/222 | | 2008/0126689 A1 | 5/2008 | Rajan et al. |
| 2006/0123265 A1 | 6/2006 | Ruckerbauer et al. ........ 713/500 | | 2008/0126690 A1 | 5/2008 | Rajan et al. .................. 711/105 |
| 2006/0126369 A1 | 6/2006 | Raghuram ...................... 365/51 | | 2008/0126692 A1 | 5/2008 | Rajan et al. |
| 2006/0129712 A1 | 6/2006 | Raghuram ...................... 710/52 | | 2008/0133825 A1 | 6/2008 | Rajan et al. |
| 2006/0129740 A1 | 6/2006 | Ruckerbauer et al. | | 2008/0159027 A1 | 7/2008 | Kim |
| 2006/0129755 A1 | 6/2006 | Raghuram .................... 711/105 | | 2008/0170425 A1 | 7/2008 | Rajan |
| 2006/0133173 A1 | 6/2006 | Jain et al. ..................... 365/222 | | 2008/0195894 A1 | 8/2008 | Schreck et al. |
| 2006/0136791 A1 | 6/2006 | Nierle | | 2008/0239857 A1 | 10/2008 | Rajan et al. .................. 365/227 |
| 2006/0149982 A1 | 7/2006 | Vogt ............................. 713/320 | | 2008/0239858 A1 | 10/2008 | Rajan et al. .................. 365/227 |
| 2006/0174082 A1 | 8/2006 | Bellows et al. | | 2009/0024789 A1 | 1/2009 | Rajan et al. |
| 2006/0176744 A1 | 8/2006 | Stave ............................ 365/194 | | 2009/0024790 A1 | 1/2009 | Rajan et al. |
| 2006/0179333 A1 | 8/2006 | Brittain et al. ................ 713/320 | | 2009/0109613 A1 | 4/2009 | Legen et al. |
| 2006/0179334 A1 | 8/2006 | Brittain et al. ................ 713/320 | | 2009/0216939 A1 | 8/2009 | Smith et al. |
| 2006/0180926 A1 | 8/2006 | Mullen et al. | | 2009/0285031 A1 | 11/2009 | Rajan et al. |
| 2006/0181953 A1 | 8/2006 | Rotenberg et al. ....... 365/230.06 | | 2009/0290442 A1 | 11/2009 | Rajan |
| 2006/0195631 A1 | 8/2006 | Rajamani | | 2010/0005218 A1 | 1/2010 | Gower et al. |
| 2006/0198178 A1 | 9/2006 | Kinsley et al. ................. 365/52 | | 2010/0020585 A1 | 1/2010 | Rajan |
| 2006/0203590 A1 | 9/2006 | Mori et al. .................... 365/222 | | 2010/0257304 A1 | 10/2010 | Rajan et al. |
| 2006/0206738 A1 | 9/2006 | Jeddeloh et al. .............. 713/320 | | 2010/0271888 A1 | 10/2010 | Rajan |
| 2006/0233012 A1 | 10/2006 | Sekiguchi et al. | | 2010/0281280 A1 | 11/2010 | Rajan et al. |
| 2006/0236165 A1 | 10/2006 | Cepulis et al. | | | | |
| 2006/0236201 A1 | 10/2006 | Gower et al. | | | FOREIGN PATENT DOCUMENTS | |
| 2006/0248261 A1 | 11/2006 | Jacob et al. | | | | |
| 2006/0248387 A1 | 11/2006 | Nicholson et al. ............. 714/22 | | DE | 102004053316 | 5/2006 |
| 2006/0262586 A1 | 11/2006 | Solomon et al. ................ 365/63 | | DE | 102005036528 | 2/2007 |
| 2006/0294295 A1 | 12/2006 | Fukuzo ......................... 711/105 | | EP | 0644547 | 3/1995 |
| 2007/0005998 A1 | 1/2007 | Jain et al. | | JP | 62121978 | 6/1987 |
| 2007/0050530 A1 | 3/2007 | Rajan ............................... 711/5 | | JP | 01171047 | 7/1989 |
| 2007/0058471 A1 | 3/2007 | Rajan et al. .................. 365/222 | | JP | 03-029357 | 2/1991 |
| 2007/0070669 A1 | 3/2007 | Tsern | | JP | 03029357 | 2/1991 |
| 2007/0088995 A1 | 4/2007 | Tsern et al. ................... 714/724 | | JP | 03/276487 | 12/1991 |
| 2007/0091696 A1 | 4/2007 | Niggemeier et al. | | JP | 03286234 | 12/1991 |
| 2007/0106860 A1 | 5/2007 | Foster, Sr. et al. ............ 711/170 | | JP | 07-141870 | 6/1995 |
| 2007/0136537 A1 | 6/2007 | Doblar et al. | | JP | 08/077097 | 3/1996 |
| 2007/0162700 A1 | 7/2007 | Fortin et al. .................. 711/118 | | JP | 08077097 | 3/1996 |
| 2007/0188997 A1 | 8/2007 | Hockanson et al. | | JP | 11-149775 | 6/1999 |
| 2007/0192563 A1 | 8/2007 | Rajan et al. .................. 711/202 | | JP | 2002025255 | 1/2002 |
| 2007/0195613 A1 | 8/2007 | Rajan et al. .............. 365/189.05 | | JP | 3304893 B2 | 5/2002 |
| 2007/0204075 A1 | 8/2007 | Rajan et al. | | JP | 2006236388 | 9/2006 |
| 2007/0216445 A1 | 9/2007 | Raghavan et al. .............. 326/83 | | KR | 1020040062717 | 7/2004 |
| 2007/0247194 A1 | 10/2007 | Jain ................................. 326/87 | | WO | PCT-US94-09186 | 8/1994 |
| 2007/0279084 A1 | 12/2007 | Oh et al. | | WO | WO 95/05676 | 2/1995 |
| 2007/0288683 A1 | 12/2007 | Panabaker et al. ............ 711/101 | | WO | WO9900734 | 1/1999 |
| 2007/0288686 A1* | 12/2007 | Arcedera et al. ............. 711/103 | | WO | WO01/90900 | 11/2001 |
| 2007/0288687 A1 | 12/2007 | Panabaker .................... 711/103 | | WO | WO01/97160 | 12/2001 |
| 2008/0002447 A1 | 1/2008 | Gulachenski et al. | | WO | WO2007002324 | 1/2007 |
| 2008/0010435 A1 | 1/2008 | Smith et al. | | WO | WO2007/028109 | 3/2007 |
| 2008/0025108 A1 | 1/2008 | Rajan et al. .............. 365/189.05 | | WO | WO 2007/038225 | 4/2007 |
| 2008/0025122 A1 | 1/2008 | Schakel et al. ............... 365/222 | | WO | WO2007/095080 | 8/2007 |
| 2008/0025136 A1 | 1/2008 | Rajan et al. .............. 365/230.08 | | WO | WO2008063251 | 5/2008 |
| 2008/0025137 A1 | 1/2008 | Rajan et al. .................. 365/239 | | | | |
| 2008/0027697 A1 | 1/2008 | Rajan et al. .................... 703/14 | | | | |

OTHER PUBLICATIONS

Wu et al., "eNVy: A Non-Volatile, Main Memory Storage System," to appear in ASPLOS VI.

"Using Two Chip Selects to Enable Quad Rank," IP.com PriorArtDatabase, copyright IP.com, Inc. 2004.

"BIOS and Kernel Developer's Guide (BKDG) for AMD Family 10h Processors," AMD, 31116 Rev 3.00, Sep. 7, 2007.

Skerlj et al., "Buffer Device For Memory Modules (DIMM)" Qimonda 2006, p. 1.

Written Opinion from PCT Application No. PCT/US06/24360 mailed on Jan. 8, 2007.

Preliminary Report On Patentability from PCT Application No. PCT/US06/24360 mailed on Jan. 10, 2008.

Written Opinion from International PCT Application No. PCT/US06/34390 mailed on Nov. 21, 2007.

International Search Report from PCT Application No. PCT/US06/34390 mailed on Nov. 21, 2007.

Office Action from U.S. Appl. No. 11/461,427 mailed on Sep. 5, 2008.

Final Office Action from U.S. Appl. No. 11/461,430 mailed on Sep. 8, 2008.

Notice of Allowance from U.S. Appl. No. 11/474,075 mailed on Nov. 26, 2008.

Office Action from U.S. Appl. No. 11/474,076 mailed on Nov. 3, 2008.

Office Action from U.S. Appl. No. 11/524,811 mailed on Sep. 17, 2008.

Non-final Office Action from U.S. Appl. No. 11/461,430 mailed on Feb. 19, 2009.

Final Office Action from U.S. Appl. No. 11/461,435 mailed on Jan. 28, 2009.

Non-final Office Action from U.S. Appl. No. 11/461,437 mailed on Jan. 26, 2009.

Non-final Office Action from U.S. Appl. No. 11/939,432 mailed on Feb. 6, 2009.

Wu et al., "eNVy: A Non-Volatile, Main Memory Storage System," ASPLOS-VI Proceedings—Sixth International Conference on Architectural Support for Programming Languages and Operating Systems, San Jose, California, Oct. 4-7, 1994. SIGARCH Computer Architecture News 22(Special Issue Oct. 1994).

German Office Action From German Patent Application No. 11 2006 002 300.4-55 Mailed Jun. 5, 2009 (With Translation).

Non-Final Office Action From U.S. Appl. No. 11/461,430 Mailed Feb. 19, 2009.

Final Office Action From U.S. Appl. No. 11/461,435 Mailed Jan. 28, 2009.

Non-Final Office Action From U.S. Appl. No. 11/461,437 Mailed Jan. 26, 2009.

Non-Final Office Action From U.S. Appl. No. 11/461,441 Mailed Apr. 2, 2009.

Non-Final Office Action From U.S. Appl. No. 11/611,374 Mailed Mar. 23, 2009.

Non-Final Office Action From U.S. Appl. No. 11/762,010 Mailed Mar. 20, 2009.

Non-Final Office Action From U.S. Appl. No. 11/939,432 Mailed Feb. 6, 2009.

Non-Final Office Action From U.S. Appl. No. 12/111,819 Mailed Apr. 27, 2009.

Non-Final Office Action From U.S. Appl. No. 12/111,828 Mailed Apr. 17, 2009.

Fang et al., W. Power Complexity Analysis Of Adiabatic SRAM, 6th Int. Conference On ASIC, vol. 1, Oct. 2005, pp. 334-337.

Pavan et al., P. A Complete Model Of E2PROM Memory Cells For Circuit Simulations, IEEE Transactions On Computer-Aided Design Of Integrated Circuits And Systems, vol. 22, No. 8, Aug. 2003, pp. 1072-1079.

German Office Action From German Patent Application No. 11 2006 001 810.8-55 Mailed Apr. 20, 2009 (With Translation).

Final Rejection From U.S. Appl. No. 11/461,437 Mailed Nov. 10, 2009.

Final Rejection from U.S. Appl. No. 11/762,010 Mailed Dec. 4, 2009.

Non-Final Rejection from U.S. Appl. No. 11/672,921 Mailed Dec. 08, 2009.

Non-Final Rejection from U.S. Appl. No. 11/672,924 Mailed Dec. 14, 2009.

Non-Final Rejection from U.S. Appl. No. 11/929,225 Mailed Dec. 14, 2009.

Non-Final Rejection from U.S. Appl. No. 11/929,261 Mailed Dec. 14, 2009.

Notice of Allowance From U.S. Appl. No. 11/939,432 Mailed Dec. 1, 2009.

Notice of Allowance From U.S. Appl. No. 12/111,819 Mailed Nov. 20, 2009.

Notice of Allowance From U.S. Appl. No. 12/111,828 Mailed Dec. 15, 2009.

Great Britain Office Action from GB Patent Application No. GB0800734.6 Mailed Mar. 1, 2010.

Final Office Action from U.S. Appl. No. 11/461,420 Mailed Apr. 28, 2010.

Notice of Allowance from U.S. Appl. No. 11/553,372 Mailed Mar. 12, 2010.

Notice of Allowance from U.S. Appl. No. 11/553,399 Mailed Mar. 22, 2010.

Non-Final Office Action from U.S. Appl. No. 11/588,739 Mailed Dec. 29, 2009.

Non-Final Office Action from U.S. Appl. No. 11/828,181 Mailed Mar. 2, 2010.

Non-Final Office Action from U.S. Appl. No. 11/828,182 Mailed Mar. 29, 2010.

Final Office Action from U.S. Appl. No. 11/858,518 Mailed Apr. 21, 2010.

Non-Final Office Action from U.S. Appl. No. 11/929,432 Mailed Jan. 14, 2010.

Non-Final Office Action from U.S. Appl. No. 11/929,571 Mailed Mar. 3, 2010.

Non-Final Office Action from U.S. Appl. No. 11/929,631 Mailed Mar. 3, 2010.

Non-Final Office Action from U.S. Appl. No. 11/929,636 Mailed Mar. 9, 2010.

Non-Final Office Action from U.S. Appl. No. 11/929,655 Mailed Mar. 3, 2010.

Non-Final Office Action from U.S. Appl. No. 11/939,432 Mailed Apr. 12, 2010.

Notice of Allowance from U.S. Appl. No. 12/111,819 Mailed Mar. 10, 2010.

Non-Final Office Action from U.S. Appl. No. 12/507,682 Mailed Mar. 8, 2010.

Examination Report from GB Intellectual Property Office Dated Mar. 1, 2010.

Final Office Action from U.S. Appl. No. 11/461,435 Dated May 13, 2010.

Final Office Action from U.S. Appl. No. 11/515,167 Dated Jun. 3, 2010.

Notice of Allowance from U.S. Appl. No. 11/515,223 Dated Jul. 30, 2010.

Final Office Action from U.S. Appl. No. 11/553,390 Dated Jun. 24, 2010.

Final Office Action from U.S. Appl. No. 11/672,921 Dated Jul. 23, 2010.

Final Office Action from U.S. Appl. No. 11/702,960 Dated Jun. 21, 2010.

Notice of Allowance from U.S. Appl. No. 11/762,010 Dated Jul. 2, 2010.

Notice of Allowance from U.S. Appl. No. 11/763,365 Dated Jun. 29, 2010.

Final Office Action from U.S. Appl. No. 11/929,500 Dated Jun. 24, 2010.

Office Action from U.S. Appl. No. 12/574,628 Dated Jun. 10, 2010.

Supplemental European Search Report and Search Opinion issued Sep. 21, 2009 in European Application No. 07870726.2, 8 pp.

Wu et al., "eNVy: A Non-Volatile, Main Memory Storage System", ASPLOS-VI Proceedings, Oct. 4-7, 1994, pp. 86-97.

Buffer Device for Memory Modules (DIMM), IP.com Prior Art Database, <Url: http://ip.com/IPCOM/000144850>, Feb. 10, 2007, 1 pg.

German Office Action from German Patent Application No. 11 2006 002 300.4-55 Dated May 11, 2009 (With Translation).
Great Britain Office Action from GB Patent Application No. GB0803913.3 Dated Mar. 1, 2010.
International Preliminary Examination Report From PCT Application No. PCT/US07/016385 Dated Feb. 3, 2009.
Search Report and Written Opinion From PCT Application No. PCT/US07/03460 Dated on Feb. 14, 2008.
Non-Final Office Action from U.S. Appl. No. 11/461,420 Dated Jul. 23, 2009.
Notice of Allowance from U.S. Appl. No. 11/461,430 Dated Sep. 10, 2009.
Non-Final Office Action from U.S. Appl. No. 11/461,435 Dated Aug. 5, 2009.
Non-Final Office Action from U.S. Appl. No. 11/515,167 Dated Sep. 25, 2009.
Non-Final Office Action from U.S. Appl. No. 11/515,223 Dated Sep. 22, 2009.
Non-Final Office Action from U.S. Appl. No. 11/538,041 Dated Jun. 10, 2009.
Non-Final Office Action from 11/553,372 Dated Jun. 25, 2009.
Notice of Allowance from U.S. Appl. No. 11/553,372 Dated Sep. 30, 2009.
Notice of Allowance from U.S. Appl. No. 11/553,372 Dated Aug. 4, 2010.
Non-Final Office Action from U.S. Appl. No. 11/553,390 Dated Sep. 9, 2009.
Non-Final Office Action from U.S. Appl. No. 11/553,399 Dated Jul. 7, 2009.
Notice of Allowance from U.S. Appl. No. 11/553,399 Dated Oct. 13, 2009.
Notice of Allowance from U.S. Appl. No. 11/553,399 Dated Dec. 3, 2010.
Final Office Action from U.S. Appl. No. 11/672,924 Dated Sep. 7, 2010.
Non-Final Office Action from U.S. Appl. No. 11/702,960 Dated Sep. 25, 2009.
Non-Final Office Action from U.S. Appl. No. 11/702,981 Dated Mar. 11, 2009.
Non-Final Office Action from U.S. Appl. No. 11/702,981 Dated Aug. 19, 2009.
Notice of Allowance from U.S. Appl. No. 11/762,010 Dated Oct. 22, 2010.
Non-Final Office Action from U.S. Appl. No. 11/762,013 Dated Jun. 5, 2009.
Notice of Allowance from U.S. Appl. No. 11/762,013 Dated Aug. 17, 2010.
Notice of Allowance from U.S. Appl. No. 11/762,013 Dated Dec. 7, 2010.
Non-Final Office Action from U.S. Appl. No. 11/763,365 Dated Oct. 28, 2009.
Notice of Allowance from U.S. Appl. No. 11/763,365 Dated Oct. 20, 2010.
Non-Final Office Action from U.S. Appl. No. 11/855,805 Dated Sep. 21, 2010.
Non-Final Office Action from U.S. Appl. No. 11/858,518 Dated Aug. 14, 2009.
Non-Final Office Action from U.S. Appl. No. 11/858,518 Dated Sep. 8, 2010.
Final Office Action from U.S. Appl. No. 11/929,225 Dated Aug. 27, 2010.
Final Office Action from U.S. Appl. No. 11/929,261 Dated Sep. 7, 2010.
Final Office Action from U.S. Appl. No. 11/929,286 Dated Aug. 20, 2010.
Notice of Allowance from U.S. Appl. No. 11/929,320 Dated Sep. 29, 2010.
Final Office Action from U.S. Appl. No. 11/929,403 Dated Aug. 31, 2010.
Final Office Action from U.S. Appl. No. 11/929,417 Dated Aug. 31, 2010.
Final Office Action from U.S. Appl. No. 11/929,432 Dated Aug. 20, 2010.
Final Office Action from U.S. Appl. No. 11/929,450 Dated Aug. 20, 2010.
Notice of Allowance from U.S. Appl. No. 11/929,483 Dated Oct. 7, 2010.
Non-Final Office Action from U.S. Appl. No. 11/929,500 Dated Oct. 13, 2009.
Final Office Action from U.S. Appl. No. 11/929,631 Dated Nov. 18, 2010.
Final Office Action from U.S. Appl. No. 11/929,655 Dated Nov. 22, 2010.
Notice of Allowance from U.S. Appl. No. 11/939,432 Dated Sep. 24, 2009.
Non-Final Office Action from U.S. Appl. No. 11/939,440 Dated Sep. 17, 2010.
Non-Final Office Action from U.S. Appl. No. 11/941,589 Dated Oct. 1, 2009.
Notice of Allowance from U.S. Appl. No. 11/941,589 Dated Oct. 25, 2010.
Non-Final Office Action from U.S. Appl. No. 12/057,306 Dated Oct. 8, 2010.
Non-Final Office Action from U.S. Appl. No. 12/203,100 Dated Dec. 1, 2010.
Non-Final Office Action from U.S. Appl. No. 12/769,428 Dated Nov. 8, 2010.
Non-Final Office Action from U.S. Appl. No. 12/838,896 Dated Sep. 3, 2010.
Search Report From PCT Application No. PCT/US10/038041 Dated Aug. 23, 2010.
Non-Final Office Action from U.S. Appl. No. 11/461,437 Dated Jan. 4, 2011.
Notice of Allowance from U.S. Appl. No. 11/515,223 Dated Feb. 4, 2011.
Non-Final Office Action from U.S. Appl. No. 11/553,372 Dated Jan. 5, 2011.
Final Office Action from U.S. Appl. No. 11/588,739 Dated Dec. 15, 2010.
Notice of Allowance from U.S. Appl. No. 11/762,010 Dated Feb. 18, 2011.
Final Office Action from U.S. Appl. No. 11/828,182 Dated Dec. 22, 2010.
Non-Final Office Action from U.S. Appl. No. 11/855,826 Dated Jan. 13, 2011.
Notice of Allowance from U.S. Appl. No. 11/939,432 Dated Feb. 18, 2011.
Notice of Allowance from U.S. Appl. No. 12/144,396 Dated Feb. 1, 2011.
Non-Final Office Action from U.S. Appl. No. 12/816,756 Dated Feb. 7, 2011.
Notice of Allowance from U.S. Appl. No. 11/762,013 Dated Feb. 23, 2011.
Notice of Allowance from U.S. Appl. No. 11/929,500 Dated Feb. 24, 2011.
Notice of Allowance from U.S. Appl. No. 11/763,365 Dated Mar. 1, 2011.
Final Office Action from U.S. Appl. No. 12/574,628 Dated Mar. 3, 2011.
Final Office Action from U.S. Appl. No. 11/929,571 Dated Mar. 3, 2011.
Notice of Allowance from U.S. Appl. No. 11/929,483 Dated Mar. 4, 2011.
Notice of Allowance from U.S. Appl. No. 11/553,399 Dated Mar. 18, 2011.
Final Office Action from U.S. Appl. No. 12/507,682 Dated Mar. 29, 2011.
Non-Final Office Action from U.S. Appl. No. 11/929,403 Dated Mar. 31, 2011.
Notice of Allowance from U.S. Appl. No. 12/838,896 Dated Apr. 19, 2011.
Notice of Allowance from U.S. Appl. No. 11/702,981 Dated Apr. 25, 2011.
Notice of Allowance from U.S. Appl. No. 11/929,320 Dated May 5, 2011.

Final Office Action from U.S. Appl. No. 11/939,440 Dated May 19, 2011.
Final Office Action from U.S. Appl. No. 11/855,805, Dated May 26, 2011.

Non-Final Office Action from U.S. Appl. No. 11/672,921 Dated May 27, 2011.

* cited by examiner

| Byte | Bits | Mnemonic | Description |
|---|---|---|---|
| 0 | 0 | AUTO | Auto discovery (No, Auto) |
| | 1 | ONFI | ONFI standard support (No, Yes) |
| | 3:2 | CHIPS | How many chip selects exposed (Auto, 1, 2, 4) |
| | 7:4 | — | Reserved |
| 1 | 8 | MKR | External maker code reported by flash interface circuit to host. |
| 2 | 8 | DEV | External device code reported by flash interface circuit to host. |
| 3 | 1:0 | CIPN | Internal chip number (1, 2, 4, 8) |
| | 3:2 | CELL | Cell type (2, 4, 8, 16 levels) |
| | 5:4 | SIMP | # of simultaneously programmed pages (1, 2, 4, 8) |
| | 6 | INTRL | Interleave between multiple chips (No, Yes) |
| | 7 | CACHE | Cache program (No, Yes) |
| 4 | 1:0 | PAGE | Page size (1, 2, 4, 8 KB) |
| | 2 | RSIZE | Redundant area size (8, 16 bytes / 512 bytes) |
| | 7&3 | SMIN | Serial access minimum (50/30, 25 ns) |
| | 5:4 | BSIZE | Block size (64, 128, 256, 512 KB) |
| | 6 | ORG | Organization (x8, x16) |
| 5 | 1:0 | — | Reserved |
| | 3:2 | PLANE | Plane number |
| | 6:4 | PLSIZE | Plane size (64, 128, 256, 512, 1Gb, 2Gb, 4Gb, 8Gb) |
| | 7 | — | Reserved |
| 6 | 7:0 | — | Reserved |
| 7 | 7:0 | — | Reserved |

FIG. 7

| Byte | Bits | Mnemonic | Description |
|---|---|---|---|
| 1 | 8 | MKR | External maker code reported by flash interface circuit to host. |
| 2 | 8 | DEV | External device code reported by flash interface circuit to host. |
| 3 | 1:0 | CIPN | Internal chip number (1, 2, 4, 8) |
| | 3:2 | CELL | Cell type (2, 4, 8, 16 levels) |
| | 5:4 | SIMP | # of simultaneously programmed pages (1, 2, 4, 8) |
| | 6 | INTRL | Interleave between multiple chips (No, Yes) |
| | 7 | CACHE | Cache program (No, Yes) |
| 4 | 1:0 | PAGE | Page size (1, 2, 4, 8 KB) |
| | 2 | RSIZE | Redundant area size (8, 16 bytes / 512 bytes) |
| | 7&3 | SMIN | Serial access minimum (50/30, 25 ns) |
| | 5:4 | BSIZE | Block size (64, 128, 256, 512 KB) |
| | 6 | ORG | Organization (x8, x16) |
| 5 | 1:0 | – | Reserved |
| | 3:2 | PLANE | Plane number |
| | 6:4 | PLSIZE | Plane size (64, 128, 256, 512, 1Gb, 2Gb, 4Gb, 8Gb) |
| | 7 | – | Reserved |
| – | 7:0 | – | Reserved |

| Byte | Bits | Mnemonic | Description |
|---|---|---|---|
| 0 | 0 | – | Reserved |
| | 1 | ONFI | ONFI standard support (No, Yes) |
| | 3:2 | CHIPS | Number of stacked chips (1, 2, 4, 8) |
| | 7:4 | – | Reserved |
| 1 | 8 | MKR | External maker code reported by flash interface circuit to host. |
| 2 | 8 | DEV | External device code reported by flash interface circuit to host. |
| 3 | 1:0 | CIPN | Internal chip number (1, 2, 4, 8) |
| | 3:2 | CELL | Cell type (2, 4, 8, 16 levels) |
| | 5:4 | SIMP | # of simultaneously programmed pages (1, 2, 4, 8) |
| | 6 | INTRL | Interleave between multiple chips (No, Yes) |
| | 7 | CACHE | Cache program (No, Yes) |
| 4 | 1:0 | PAGE | Page size (1, 2, 4, 8 KB) |
| | 2 | RSIZE | Redundant area size (8, 16 bytes / 512 bytes) |
| | 7&3 | SMIN | Serial access minimum (50/30, 25 ns) |
| | 5:4 | BSIZE | Block size (64, 128, 256, 512 KB) |
| | 6 | ORG | Organization (x8, x16) |
| 5 | 1:0 | – | Reserved |
| | 3:2 | PLANE | Plane number |
| | 6:4 | PLSIZE | Plane size (64, 128, 256, 512, 1Gb, 2Gb, 4Gb, 8Gb) |
| | 7 | – | Reserved |
| 6 | 7:0 | – | Reserved |

FIG. 9

SYSTEM AND METHOD FOR INCREASING CAPACITY, PERFORMANCE, AND FLEXIBILITY OF FLASH STORAGE

This application claims benefit of priority to U.S. Provisional Patent Application Ser. No. 60/849,631, filed on Oct. 5, 2006, which is incorporated herein by reference in its entirety. However, insofar as any definitions, information used for claim interpretation, or other disclosure from the above identified application conflicts with that set forth herein, such definitions, information, etc. in the present application should apply.

FIELD OF THE INVENTION

The present invention relates to memory, and more particularly to enhanced capacity, performance, flexibility, and reliability in multiple flash memory circuit systems.

BACKGROUND

Flash memory devices are gaining wide popularity and are used in many products such as MP3 players, USB storage keys, digital still cameras, even flash hard drives. These applications demand higher capacity, and higher performance while the marketplaces require ever lower and lower cost. The increase in flash capacity is limited by process technology, die size and production cost. Novel solutions are required to increase capacity, performance, and flexibility of flash while still resulting in cost effective implementations.

BRIEF DESCRIPTION OF THE DRAWINGS

The following detailed description makes reference to the accompanying drawings, which are now briefly described.

FIG. 7 illustrates one embodiment of a configuration block.

FIG. 8 illustrates one embodiment of a ROM block.

FIG. 9 illustrates one embodiment of a flash discovery block.

Figure 1:
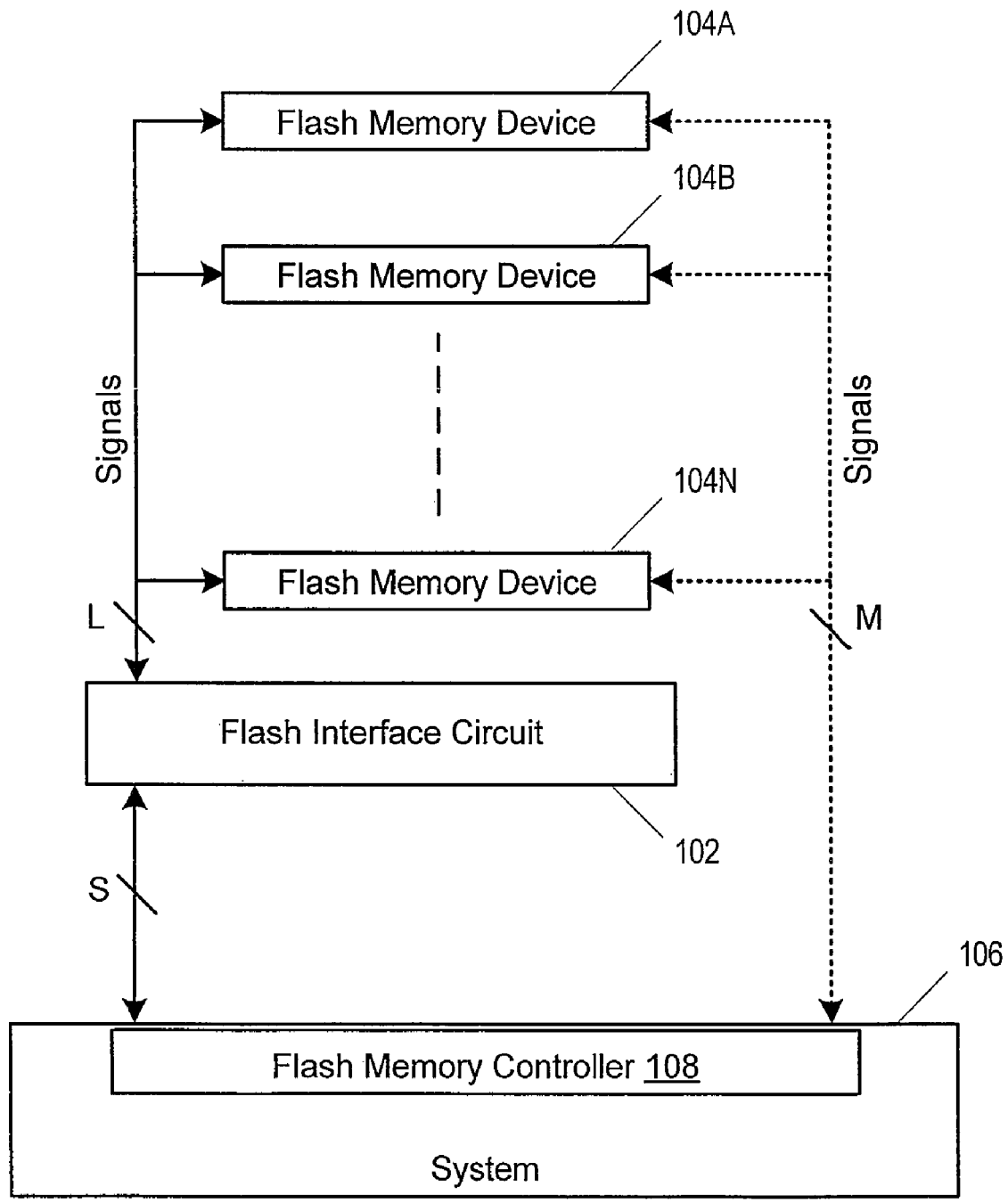
FIG. 1 illustrates a block diagram of one embodiment of multiple flash memory devices connected to a flash interface circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

This description includes numerous embodiments of flash devices and flash interface circuits. Embodiments are contemplated that include any combination of one or more of the features described below, including an embodiment that comprises all features described below. Embodiments including any subset or superset of the features and other features are also contemplated.

Flash Interface Circuit

FIG. 1 shows a block diagram of several flash memory devices 104A-104N connected to a system 106 by way of a flash interface circuit 102. The system 106 may include a flash memory controller 108 configured to interface to flash memory devices. The flash interface circuit 102 is a device which exposes multiple flash memory devices attached to the flash interface circuit 102 as at least one flash memory device to the rest of the system (e.g. the flash memory controller). The flash memory device(s) exposed to the rest of the system may be referred to as virtual flash memory device(s). One or more attributes of the virtual flash memory device(s) may differ from the attributes of the flash memory devices 104A-140N. Thus, the flash memory controller 108 may interface to the flash interface circuit 102 as if the flash interface circuit 102 were the virtual flash device(s). Internally, the flash interface circuit 102 translates a request from the system 106 into requests to flash memory devices 104A-104N and responses from flash memory devices 104A-104N into a response to the system 106. During discovery of flash configuration by the system 106, the flash interface circuit 102 presents modified information to the system 106. That is, the information presented by the flash interface circuit 102 during discovery differs in one or more aspects from the information that the flash memory devices 104A-104N would present during discovery.

FIG. 1 shows a block diagram of, for example, one or more small flash memory devices 104A-104N connected to a flash interface circuit 102. Also shown are exemplary connections of data bus & control signals between flash memory devices 104A-104N and a flash interface circuit 102. Also shown are exemplary data bus & control signals between the flash interface circuit 102 and a host system 106. In general, one more signals of the interface (address, data, and control) to the flash memory devices 104A-104N may be coupled to the flash interface circuit 102 and zero or more signals of the interface to the flash memory devices 104A-104N may be coupled to the system 106. In various embodiments, the flash interface circuit 102 may be coupled to all of the interface or a subset of the signals forming the interface. In FIG. 1, the flash interface circuit 102 is coupled to L signals (where L is an integer greater than zero) and the system 106 is coupled to M signals (where M is an integer greater than or equal to zero). Similarly, the flash interface circuit 102 is coupled to S signals to the system 106 in FIG. 1 (where S is an integer greater than zero).

In one embodiment, the flash interface circuit 102 may expose a number of attached flash memory devices 104A-104N as a smaller number of flash memory devices having a larger storage capacity. For example, the flash interface circuit may expose 1, 2, 4, or 8 attached flash memory devices 104A-104N to the host system as 1, 2 or 4 flash memory devices. Embodiments are contemplated in which the same number of flash devices are attached and presented to the host system, or in which fewer flash devices are presented to the host system than are actually attached. Any number of devices may be attached and any number of devices may be presented to the host system by presentation to the system in a manner that differs in at least one respect from the presentation to the system that would occur in the absence of the flash interface circuit 102.

For example, the flash interface circuit 102 may provide vendor-specific protocol translation between attached flash memory devices and may present itself to host as a different type of flash, or a different configuration, or as a different vendor's flash device. In other embodiments, the flash interface circuit 102 may present a virtual configuration to the host system emulating one or more of the following attributes: a desired (smaller or larger) page size, a desired (wider or narrower) bus width, a desired (smaller or larger) block size, a desired redundant storage area (e.g. 16 bytes per 512 bytes), a desired plane size (e.g. 2 Gigabytes), a desired (faster) access time with slower attached devices, a desired cache size, a desired interleave configuration, auto configuration, and open NAND flash interface (ONFI).

Throughout this disclosure, the flash interface circuit may alternatively be termed a "flash interface circuit", or a "flash interface device". Throughout this disclosure, the flash memory chips may alternatively be termed "memory circuits", or a "memory device", or as "flash memory device", or as "flash memory".

Figure 2:
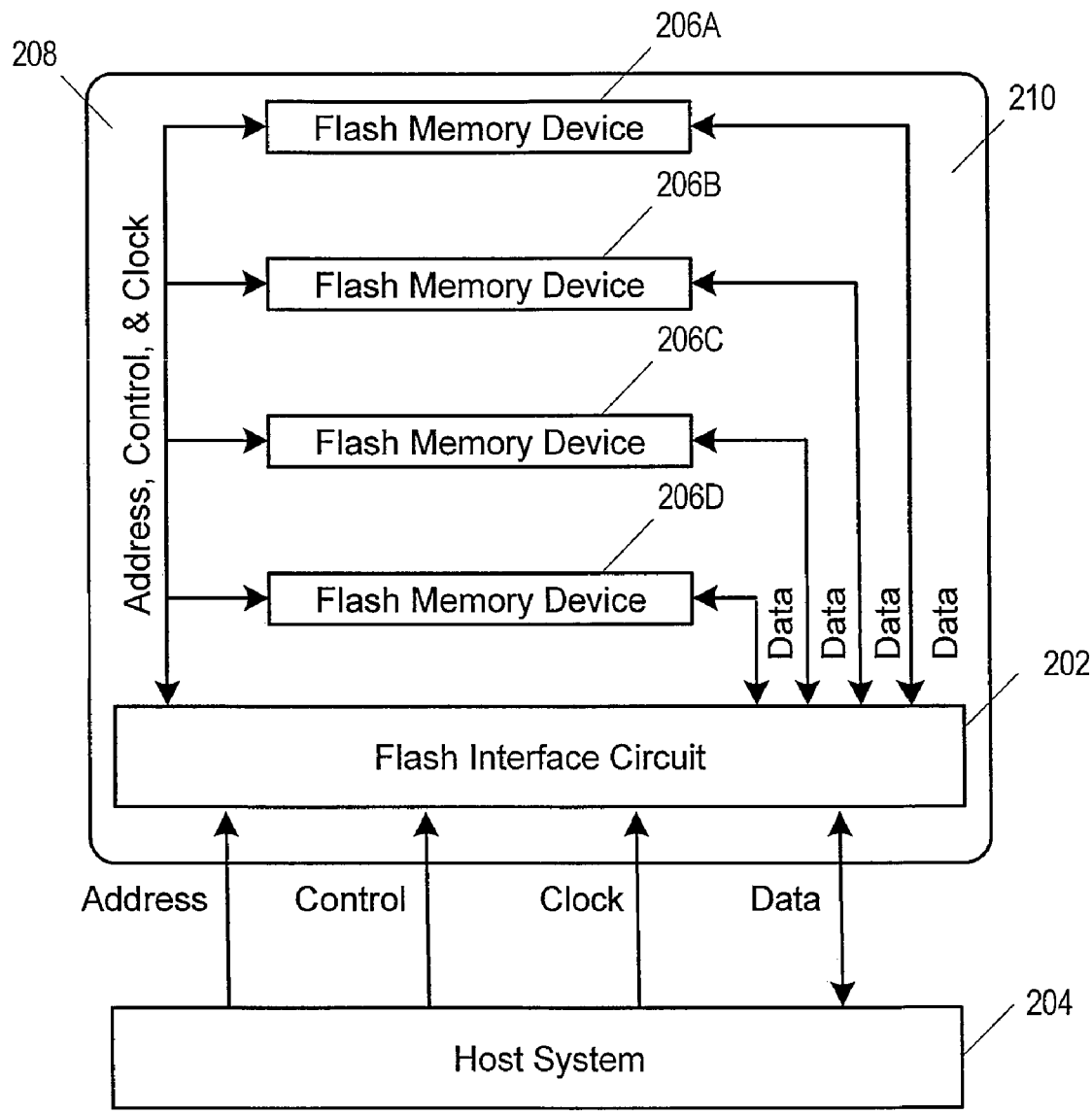
FIG. 2 illustrates the detailed connections between a flash interface circuit and flash memory devices for one embodiment.

FIG. 2 shows another embodiment with possible exemplary connections between the host system 204, the flash interface circuit 202 and the flash memory devices 206A-206D. In this example, all signals from the host system are received by the flash interface circuit before presentation to the flash memory devices. And all signals from the flash memory devices are received by the flash interface circuit before being presented to the host system 204. For example, address, control, and clock signals 208 and data signals 210 are shown in FIG. 2. The control signals may include a variety of controls in different embodiments. For example, the control signals may include chip select signals, status signals, reset signals, busy signals, etc.

For the remainder of this disclosure, the flash interface circuit will be referred to. The flash interface circuit may be, in various embodiments, the flash interface circuit 102, the flash interface circuit 202, or other flash interface circuit embodiments (e.g. embodiments shown in FIGS. 3-6). Similarly, references to the system or the host system may be, in various embodiments, the host system 106, the host system 204, or other embodiments of the host system. The flash memory devices may be, in various embodiments, the flash memory devices 104A-104N, the flash memory devices 206A-206D, or other embodiments of flash memory devices.

Relocating Bad Blocks

A flash memory is typically divided into sub-units, portions, or blocks. The flash interface circuit can be used to manage relocation of one or more bad blocks in a flash memory device transparently to the system and applications. Some systems and applications may not be designed to deal with bad blocks since the error rates in single level NAND flash memory devices were typically small. This situation has, however, changed with multi-level NAND devices where error rates are considerably increased.

In one embodiment the flash interface circuit may detect the existence of a bad block by means of monitoring the error-correction and error-detection circuits. The error-correction and error-detection circuits may signal the flash interface circuit when errors are detected or corrected. The flash interface circuit may keep a count or counts of these errors. As an example, a threshold for the number of errors detected or corrected may be set. When the threshold is exceeded the flash interface circuit may consider certain region or regions of a flash memory as a bad block. In this case the flash memory may keep a translation table that is capable of translating a logical block location or number to a physical location or number. In some embodiments the flash interface circuit may keep a temporary copy of some or all of the translation tables on the flash memories. When a block is accessed by the system, the combination of the flash interface circuit and flash memory together with the translation tables may act to ensure that the physical memory location that is accessed is not in a bad block.

The error correction and/or error detection circuitry may be located in the host system, for example in a flash memory controller or other hardware. Alternatively, the error correction and/or error detection circuitry may be located in the flash interface circuit or in the flash memory devices themselves.

Increased ECC Protection

A flash memory controller is typically capable of performing error detection and correction by means of error-detection and correction codes. A type of code suitable for this purpose is an error-correcting code (ECC). Implementations of ECC may be found in Multi-Level Cell (MLC) devices, in Single-Level Cell (SLC) devices, or in any other flash memory devices.

In one embodiment, the flash interface circuit can itself generate and check the ECC instead of, or in combination with, the flash memory controller. Moving some or all of the ECC functionality into a flash interface circuit enables the use of MLC flash memory devices in applications designed for the lower error rate of a SLC flash memory devices.

Flash Driver

A flash driver is typically a piece of software that resides in host memory and acts as a device driver for flash memory. A flash driver makes the flash memory appear to the host system as a read/write memory array. The flash driver supports basic file system functions (e.g. read, write, file open, file close etc.) and directory operation (e.g. create, open, close, copy etc.). The flash driver may also support a security protocol.

In one embodiment, the flash interface circuit can perform the functions of the flash driver (or a subset of the functions) instead of, or in combination with, the flash memory controller. Moving some or all of the flash driver functionality into a flash interface circuit enables the use of standard flash devices that do not have integrated flash driver capability and/or standard flash memory controllers that do not have integrated flash driver capability. Integrating the flash driver into the flash interface circuit may thus be more cost-effective.

Garbage Collection

Garbage collection is a term used in system design to refer to the process of using and then collecting, reclaiming, and reusing those areas of host memory. Flash file blocks may be marked as garbage so that they can be reclaimed and reused. Garbage collection in flash memory is the process of erasing these garbage blocks so that they may be reused. Garbage collection may be performed, for example, when the system is idle or after a read/write operation. Garbage collection may be, and generally is, performed as a software operation.

In one embodiment, the flash interface circuit can perform garbage collection instead of, or in combination with, the flash memory controller. Moving some or all of the garbage collection functionality into a flash interface circuit enables the use of standard flash devices that do not have integrated garbage collection capability and/or standard flash memory controllers that do not have integrated garbage collection capability. Integrating the garbage collection into the flash interface circuit may thus be more cost-effective.

Wear Leveling

The term leveling, and in particular the term wear leveling, refers to the process to spread read and write operations evenly across a memory system in order to avoid using one or more areas of memory heavily and thus run the risk of wearing out these areas of memory. A NAND flash often implements wear leveling to increase the write lifetime of a flash file system. To perform wear leveling, files may be moved in the flash device in order to ensure that all flash blocks are utilized relatively evenly. Wear leveling may be performed, for example, during garbage collection. Wear leveling may be, and generally is, performed as a software operation.

In one embodiment, the flash interface circuit can perform wear leveling instead of, or in combination with, the flash memory controller. Moving some or all of the wear leveling functionality into a flash interface circuit enables the use of standard flash devices that do not have integrated wear leveling capability and/or standard flash memory controllers that do not have integrated wear leveling capability. Integrating the wear leveling into the flash interface circuit may thus be more cost-effective.

Increasing Erase and Modify Bandwidth

Typically, flash memory has a low bandwidth (e.g. for read, erase and write operations, etc.) and high latency (e.g. for read and write operations) that are limits to system performance. One limitation to performance is the time required to erase the flash memory cells. Prior to writing new data into the flash memory cells, those cells are erased. Thus, writes are often delayed by the time consumed to erase data in the flash memory cells to be written.

In a first embodiment that improves erase performance, logic circuits in the flash interface circuit may perform a pre-erase operation (e.g. advanced scheduling of erase operations, etc.). The pre-erase operation may erase unused data in one or more blocks. Thus when a future write operation is requested the block is already pre-erased and associated time delay is avoided.

In a second embodiment that improves erase performance, data need not be pre-erased. In this case performance may still be improved by accepting transactions to a portion or portion(s) of the flash memory while erase operations of the portion or portion(s) is still in progress or even not yet started. The flash interface circuit may respond to the system that an erase operation of these portion(s) has been completed, despite the fact that it has not. Writes into these portion(s) may be buffered by the flash interface circuit and written to the portion(s) once the erase is completed.

Reducing Read Latency by Prefetching

In an embodiment that reduces read latency, logic circuits in the flash interface circuit may perform a prefetching operation. The flash interface circuit may read data from the flash memory ahead of a request by the system. Various prefetch algorithms may be applied to predict or anticipate system read requests including, but not limited to, sequential, stride based prefetch, or non-sequential prefetch algorithms. The prefetch algorithms may be based on observations of actual requests from the system, for example.

The flash interface circuit may store the prefetched data read from the flash memory devices in response to the prefetch operations. If a subsequent read request from the system is received, and the read request is for the prefetched data, the prefetched data may be returned by the flash interface circuit to the system without accessing the flash memory devices. In one embodiment, if the subsequent read request is received while the prefetch operation is outstanding, the flash interface circuit may provide the read data upon completion of the prefetch operation. In either case, read latency may be decreased.

Increasing Write Bandwidth

In an embodiment that improves write bandwidth, one or more flash memory devices may be connected to a flash interface circuit. The flash interface circuit may hold (e.g. buffer etc.) write requests in internal SRAM and write them into the multiple flash memory chips in an interleaved fashion (e.g. alternating etc.) thus increasing write bandwidth. The flash interface circuit may thus present itself to system as a monolithic flash memory with increased write bandwidth performance.

Increasing Bus Bandwidth

The flash memory interface protocol typically supports either an 8-bit or 16-bit bus. For an identical bus frequency of operation, a flash memory with a 16-bit bus may deliver up to twice as much bus bandwidth as a flash memory with an 8-bit bus. In an embodiment that improves the data bus bandwidth, the flash interface circuit may be connected to one or more flash memory devices. In this embodiment, the flash interface circuit may interleave one or more data busses. For example, the flash interface circuit may interleave two 8-bit busses to create a 16-bit bus using one 8-bit bus from each of two flash memory devices. Data is alternately written or read from each 8-bit bus in a time-interleaved fashion. The interleaving allows the flash interface circuit to present the two flash memories to the system as a 16-bit flash memory with up to twice the bus bandwidth of the flash memory devices connected to the flash interface circuit. In another embodiment, the flash interface circuit may use the data buses of the flash memory devices as a parallel data bus. For example, the address and control interface to the flash memory devices may be shared, and thus the same operation is presented to each flash memory device concurrently. The flash memory device may source or sink data on its portion of the parallel data bus. In either case, the effective data bus width may be N times the width of one flash memory device, where N is a positive integer equal to the number of flash memory devices.

Cross-Vendor Compatibility

The existing flash memory devices from different vendors may use similar, but not identical, interface protocols. These different protocols may or may not be compatible with each other. The protocols may be so different that it is difficult or impossible to design a flash memory controller that is capable of controlling all possible combinations of protocols. Therefore system designers must often design a flash memory controller to support a subset of all possible protocols, and thus a subset of flash memory vendors. The designers may thus lock themselves into a subset of available flash memory vendors, reducing choice and possibly resulting in a higher price that they must pay for flash memory.

In one embodiment that provides cross-vendor compatibility, the flash interface circuit may contain logic circuits that may translate between the different protocols that are in use by various flash memory vendors. In such an embodiment, the flash interface circuit may simulate a flash memory with a first protocol using one or more flash memory chips with a second protocol. The configuration of the type (e.g. version etc.) of protocol may be selected by the vendor or user (e.g. by using a bond-out option, fuses, e-fuses, etc.). Accordingly, the flash memory controller may be designed to support a specific protocol and that protocol may be selected in the flash interface circuit, independent of the protocol(s) implemented by the flash memory devices.

Protocol Translation

NAND flash memory devices use a certain NAND-flash-specific interface protocol. NOR flash memory devices use a different, NOR-flash-specific protocol. These different NAND and NOR protocols may not and generally are not compatible with each other. The protocols may be so different that it is difficult or impossible to design a flash memory controller that is capable of controlling both NAND and NOR protocols.

In one embodiment that provides compatibility with NOR flash, the flash interface circuit may contain logic circuits that may translate between the NAND protocols that are in use by the flash memory and a NOR protocol that interfaces to a host system or CPU. Similarly, an embodiment that provides compatibility with NAND flash may include a flash interface circuit that contains logic circuits to translate between the NOR protocols used by the flash memory and a NAND protocol that interfaces to a host system or CPU.

Backward Compatibility using Flash Memory Device Stacking

As new flash memory devices become available, it is often desirable or required to maintain pin interface compatibility with older generations of the flash memory device. For example a product may be designed to accommodate a certain capacity of flash memory that has an associated pin interface. It may then be required to produce a second generation of this product with a larger capacity of flash memory and yet keep as much of the design unchanged as possible. It may thus be desirable to present a common pin interface to a system that is compatible with multiple generations (e.g. successively larger capacity, etc.) of flash memory.

Figure 3:
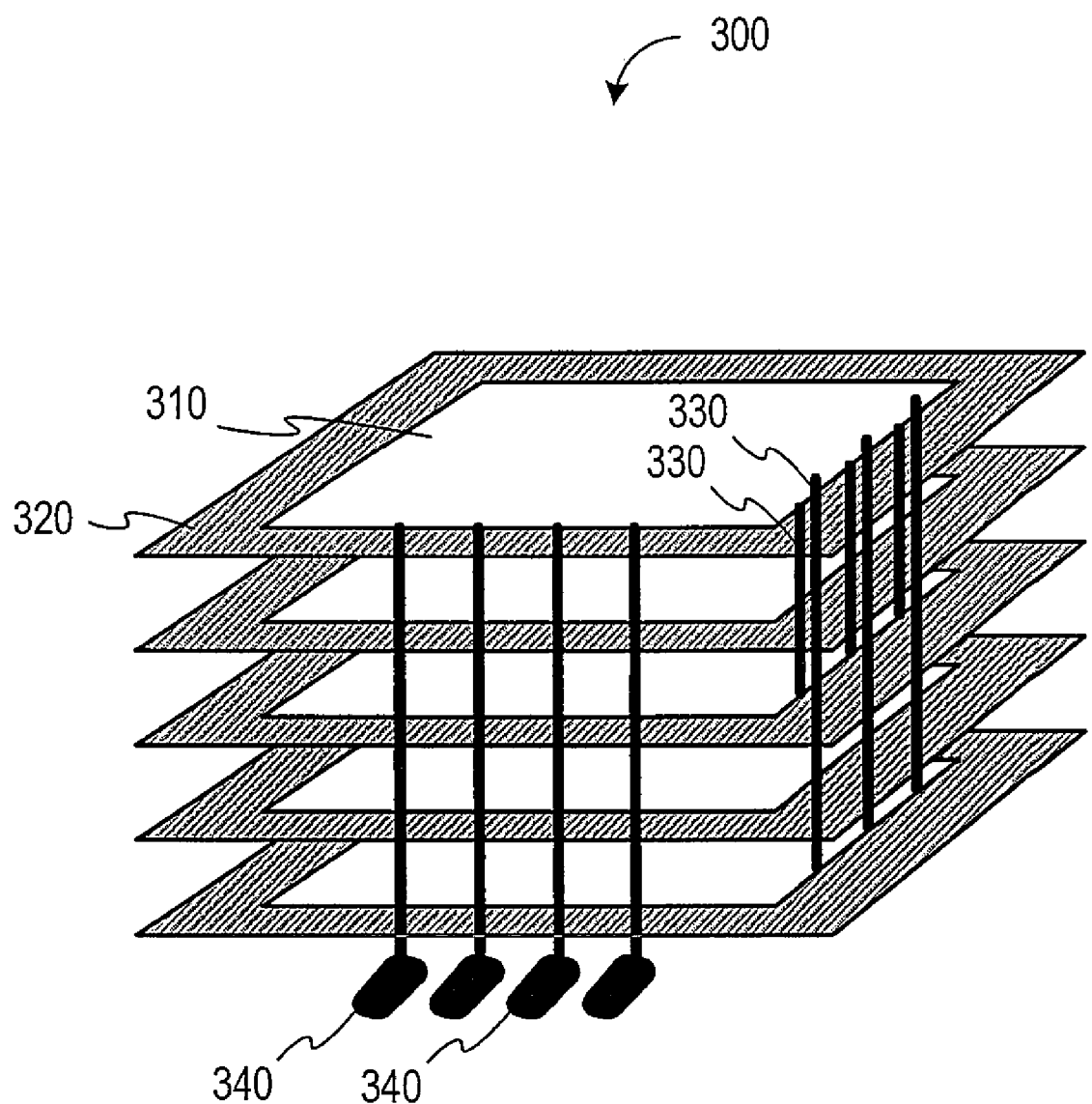
FIG. 3 illustrates stacked assemblies having edge connections for one embodiment.

FIG. 3 shows one embodiment that provides such backward compatibility, the flash interface circuit 310 may be connected by electrical conductors 330 to multiple flash memory devices 320 in a package 300 having an array of pins 340 with a pin interface (e.g. pinout, array of pins, etc.) that is the same as an existing flash memory chip (e.g. standard pinout, JEDEC pinout, etc.). In this manner the flash interface circuit enables the replacement of flash memory devices in existing designs with a flash memory device that may have higher capacity, higher performance, lower cost, etc. The package 300 may also optionally include voltage conversion resistors or other voltage conversion circuitry to supply voltages for electrical interfaces of the flash interface circuit, if supply voltages of the flash devices differ from those of the flash interface circuit.

The pin interface implemented by pins 340, in one exemplary embodiment, may include a ×8 input/output bus, a command latch enable, an address latch enable, one or more chip enables (e.g. 4), read and write enables, a write protect, one or more ready/busy outputs (e.g. 4), and power and ground connections. Other embodiments may have any other interface. The internal interface on conductors 330 may differ (e.g. a ×16 interface), auto configuration controls, different numbers of chip enables and ready/busy outputs (e.g. 8), etc. Other interface signals may be similar (e.g. command and address latch enables, read and write enables, write protect, and power/ground connections).

In general, the stacked configuration shown in FIG. 3 may be used in any of the embodiments described herein.

Transparently Enabling Higher Capacity

In several of the embodiments that have been described above the flash interface circuit is used to simulate to the system the appearance of a first one (or more) flash memories from a second one (or more) flash memories that are connected to the flash interface circuit. The first one or more flash memories are said to be virtual. The second one or more flash memories are said to be physical. In such embodiments at least one aspect of the virtual flash memory may be different from the physical memory.

Typically, a flash memory controller obtains certain parameters, metrics, and other such similar information from the flash memory. Such information may include, for example, the capacity of the flash memory. Other examples of such parameters may include type of flash memory, vendor identification, model identification, modes of operation, system interface information, flash geometry information, timing parameters, voltage parameters, or other parameters that may be defined, for example, by the Common Flash Interface (CFI), available at the INTEL website, or other standard or non-standard flash interfaces. In several of the embodiments described, the flash interface circuit may translate between parameters of the virtual and physical devices. For example, the flash interface circuit may be connected to one or more physical flash memory devices of a first capacity. The flash interface circuit acts to simulate a virtual flash memory of a second capacity. The flash interface circuit may be capable of querying the attached one or more physical flash memories to obtain parameters, for example their capacities. The flash interface circuit may then compute the sum capacity of the attached flash memories and present a total capacity (which may or may not be the same as the sum capacity) in an appropriate form to the system. The flash interface circuit may contain logic circuits that translate requests from the system to requests and signals that may be directed to the one or more flash memories attached to flash interface circuit.

In another embodiment, the flash interface circuit transparently presents a higher capacity memory to the system. FIG. 3 shows a top view of a portion of one embodiment of a stacked package assembly 300. In the embodiment shown in FIG. 3, stacking the flash memory devices on top of a flash interface circuit results in a package with a very small volume. Various embodiments may be tested and burned in before assembly. The package may be manufactured using existing assembly infrastructure, tested in advance of stack assembly and require significantly less raw material, in some embodiments. Other embodiments may include a radial configuration, rather than a stack, or any other desired assembly.

In the embodiment shown in FIG. 3, the electrical connections between flash memory devices and the flash interface circuit are generally around the edge of the physical perimeter of the devices. In alternative embodiments the connections may be made through the devices, using through-wafer interconnect (TWI), for example. Other mechanisms for electrical connections are easily envisioned.

Integrated Flash Interface Circuit with One or More Flash Devices

Figure 4:
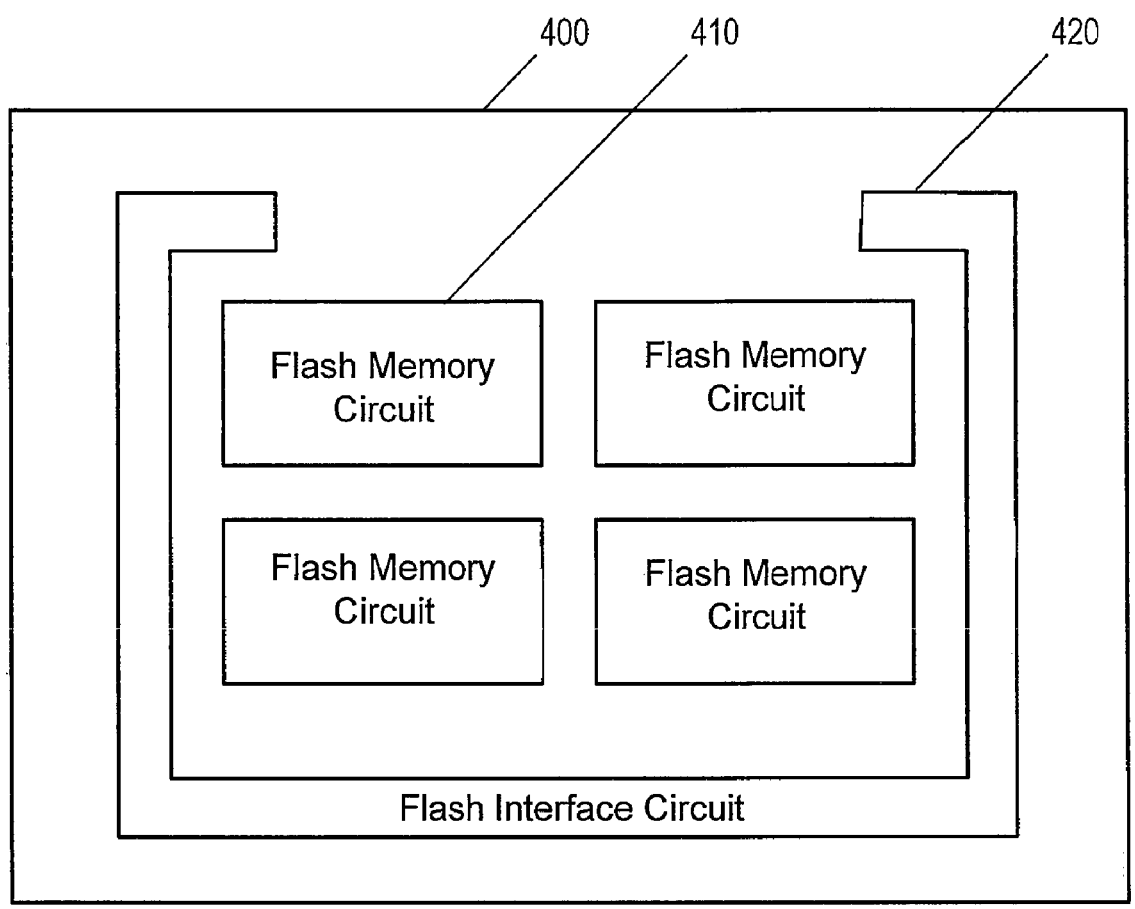
FIG. 4 illustrates one embodiment of a single die having a flash interface circuit and one or more flash memory circuits.

In another embodiment, the flash interface circuit may be integrated with one or more flash devices onto a single monolithic semiconductor die. FIG. 4 shows a view of a die 400 including one or more flash memory circuits 410 and one or more flash interface circuits 420.

Flash Interface Circuit with Configuration and Translation

Figure 5:
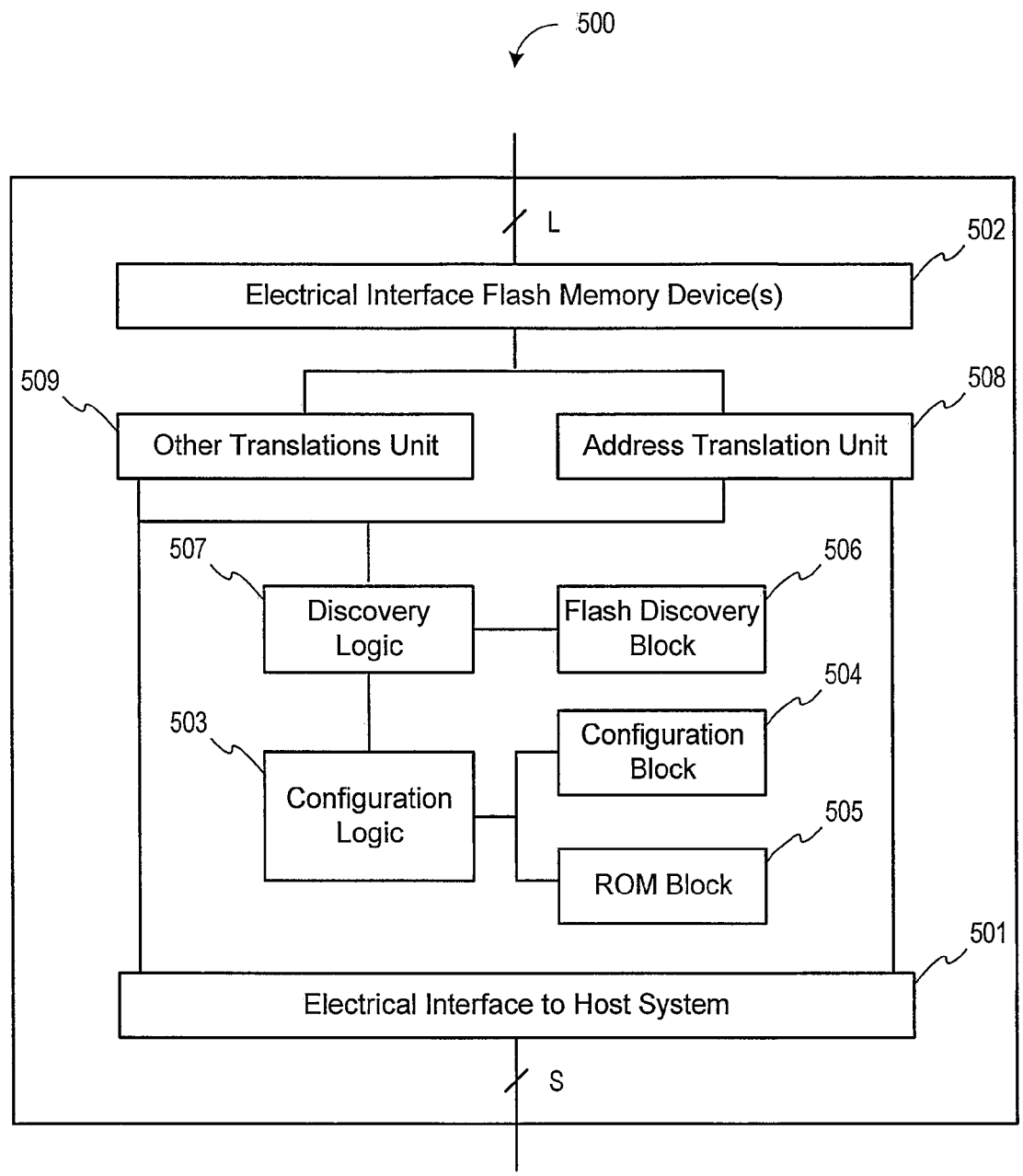
FIG. 5 illustrates an exploded view of one embodiment of a flash interface circuit.

In the embodiment shown in FIG. 5, flash interface circuit 500 includes an electrical interface to the host system 501, an electrical interface to the flash memory device(s) 502, configuration logic 503, a configuration block 504, a read-only memory (ROM) block 505, a flash discovery block 506, discovery logic 507, an address translation unit 508, and a unit for translations other than address translations 509. The electrical interface to the flash memory device(s) 502 is coupled to the address translation unit 508, the other translations unit 509, and the L signals to the flash memory devices (e.g. as illustrated in FIG. 1). That is, the electrical interface 502 comprises the circuitry to drive and/or receive signals to/from the flash memory devices. The electrical interface to the host system 501 is coupled to the other translations unit 509, the address translation unit 508, and the signals to the host interface (S in FIG. 5). That is, the electrical interface 501 comprises the circuitry to drive and/or receive signals to/from the host system. The discovery logic 507 is coupled to the configuration logic 503, and one or both of logic 507 and 503 is coupled to the other translations unit 509 and the address translation unit 508. The flash discovery block 506 is coupled to the discovery logic 507, and the configuration block 504 and the ROM block 505 are coupled to the configuration logic 503. Generally, the logic 503 and 507 and the translation units 508 and 509 may be implemented in any desired fashion (combinatorial logic circuitry, pipelined circuitry, processor-based software, state machines, various other circuitry, and/or any combination of the foregoing). The blocks 504, 506, and 508 may comprise any storage circuitry (e.g. register files, random access memory, etc.).

The translation units 508 and 509 may translate host flash memory access and configuration requests into requests to one or more flash memory devices, and may translate flash memory replies to host system replies if needed. That is, the translation units 508 and 509 may be configured to modify requests provided from the host system based on differences between the virtual configuration presented by the interface circuit 500 to the host system and the physical configuration of the flash memory devices, as determined by the discovery logic 507 and/or the configuration logic 503 and stored in the configuration block 504 and/or the discovery block 506. The configuration block 504, the ROM block 505, and/or the flash discovery block 506 may store data identifying the physical and virtual configurations.

There are many techniques for determining the physical configuration, and various embodiments may implement one or more of the techniques. For example, configuration using a discovery process implemented by the discovery logic 507 is one technique. In one embodiment, the discovery (or auto configuration) technique may be selected using an auto configuration signal mentioned previously (e.g. strapping the signal to an active level, either high or low). Fixed configuration information may be programmed into the ROM block 505, in another technique. The selection of this technique may be implemented by strapping the auto configuration signal to an inactive level.

In one implementation, the configuration block (CB) 504 stores the virtual configuration. The configuration may be set during the discovery process, or may be loaded from ROM block 505. Thus, the ROM block 505 may store configuration data for the flash memory devices and/or configuration data for the virtual configuration.

The flash discovery block (FB) 306 may store configuration data discovered from attached flash memory devices. In one embodiment, if some information is not discoverable from attached flash memory devices, that information may be copied from ROM block 505.

The configuration block 504, the ROM block 505, and the discovery block 506 may store configuration data in any desired format and may include any desired configuration data, in various embodiments. Exemplary configurations of the configuration block 504, the ROM block 505, and the discovery block 506 are illustrated in FIGS. 7, 8, and 9, respectively.

FIG. 7 is a table 700 illustrating one embodiment of configuration data stored in one embodiment of a configuration block 504. The configuration block 504 may comprise one or more instances of the configuration data in table 700 for various attached flash devices and for the virtual configuration. In the embodiment of FIG. 7, the configuration data comprises 8 bytes of attributes, labeled 0 to 7 in FIG. 7 and having various bit fields as shown in FIG. 7.

Byte zero includes a auto discover bit (AUTO), indicating whether or not auto discovery is used to identify the configuration data; an ONFI bit indicating if ONFI is supported; and a chips field (CHIPS) indicating how many chip selects are exposed (automatic, 1, 2, or 4 in this embodiment, although other variations are contemplated). Byte one is a code indicate the manufacturer (maker) of the device (or the maker reported to the host); and byte two is a device code identifying the particular device from that manufacturer.

Byte three includes a chip number field (CIPN) indicating the number of chips that are internal to flash memory system (e.g. stacked with the flash interface circuit or integrated on the same substrate as the interface circuit, in some embodiments). Byte three also includes a cell field (CELL) identifying the cell type, for embodiments that support multilevel cells. The simultaneously programmed field (SIMP) indicates the number of simultaneously programmed pages for the flash memory system. The interleave bit (INTRL) indicates whether or not chip interleave is supported, and the cache bit (CACHE) indicates whether or not caching is supported.

Byte four includes a page size field (PAGE), a redundancy size bit (RSIZE) indicating the amount of redundancy supported (e.g. 8 or 16 bytes of redundancy per 512 bytes, in this embodiment), bits (SMIN) indicating minimum timings for serial access, a block size field (BSIZE) indicating the block size, and an organization byte (ORG) indicating the data width organization (e.g. ×8 or ×16, in this embodiment, although other widths are contemplated). Byte five includes plane number and plane size fields (PLANE and PLSIZE). Some fields and bytes are reserved for future expansion.

It is noted that, while various bits are described above, multibit fields may also be used (e.g. to support additional variations for the described attribute). Similarly, a multibit field may be implemented as a single bit if fewer variations are supported for the corresponding attribute.

FIG. 8 is a table 800 of one embodiment of configuration data stored in the ROM block 505. The ROM block 505 may comprise one or more instances of the configuration data in table 800 for various attached flash devices and for the configuration presented to the host system. The configuration data, this embodiment, is a subset of the data stored in the configuration block. That is, bytes one to five are included. Byte 0 may be determined through discovery, and bytes 6 and 7 are reserved and therefore not needed in the ROM block 505 for this embodiment.

FIG. 9 is a table 900 of one embodiment of configuration data that may be stored in the discovery block 506. The discovery block 506 may comprise one or more instances of the configuration data in table 900 for various attached flash devices. The configuration data, this embodiment, is a subset of the data stored in the configuration block. That is, bytes zero to five are included (except for the AUTO bit, which is implied as a one in this case). Bytes 6 and 7 are reserved and therefore not needed in the discovery block 506 for this embodiment.

In one implementation, the discovery information is discovered using one or more read operations to the attached flash memory devices, initiated by the discovery logic 507. For example, a read cycle may be used to test if ONFI is enabled for one or more of the attached devices. The test results may be recorded in the ONFI bit of the discovery block. Another read cycle or cycles may test for the number of flash chips; and the result may be recorded in the CHIPS field. Remaining attributes may be discovered by reading the ID definition table in the attached devices. In one embodiment the attached flash chips may have the same attributes. Alternatively, multiple instances of the configuration data may be stored in the discovery block 506 and various attached flash memory devices may have differing attributes.

As mentioned above, the address translation unit 508 may translate addresses between the host and the flash memory devices. In one embodiment, the minimum page size is 1 kilobyte (KB). In another embodiment the page size is 8 KB. In yet another embodiment the page size is 2 KB. Generally, the address bits may be transmitted to the flash interface circuit over several transfers (e.g. 5 transfers, in one embodiment). In a five transfer embodiment, the first two transfers comprise the address bits for the column address, low order address bits first (e.g. 11 bits for a 1 KB page up to 14 bits for an 8 KB page). The last three transfers comprise the row address, low order bits first.

In one implementation, an internal address format for the flash interface circuit comprises a valid bit indicating whether or not a request is being transmitted; a device field identifying the addressed flash memory device; a plane field identifying a plane within the device, a block field identifying the block number within the plane; a page number identifying a page within the block; a redundant bit indicating whether or not the redundant area is being addressed, and column address field containing the column address.

In one embodiment, a host address is translated to the internal address format according the following rules (where CB_[label] corresponds to fields in FIG. 7):

```
COL[7:0] = Cycle[1][7:0];
COL[12:8] = Cycle[2][4:0];
R = CB_PAGE == 0 ? Cycle[2][2]
   : CB_PAGE == 1 ?   Cycle[2][3]
   : CB_PAGE == 2 ?   Cycle[2][4]
   :                  Cycle[2][5];
// block 64,128,256,512K / page 1,2,4,8K
PW[2:0] = CB_BSIZE == 0 && CB_PAGE == 0 ?   6-6 //  0
        : CB_BSIZE == 0 && CB_PAGE == 1 ?   5-6 // -1
        : CB_BSIZE == 0 && CB_PAGE == 2 ?   4-6 // -2
        : CB_BSIZE == 0 && CB_PAGE == 3 ?   3-6 // -3
        : CB_BSIZE == 1 && CB_PAGE == 0 ?   7-6 //  1
        : CB_BSIZE == 1 && CB_PAGE == 1 ?   6-6 //  0
        : CB_BSIZE == 1 && CB_PAGE == 2 ?   5-6 // -1
        : CB_BSIZE == 1 && CB_PAGE == 3 ?   4-6 // -2
        : CB_BSIZE == 2 && CB_PAGE == 0 ?   8-6 //  2
        : CB_BSIZE == 2 && CB_PAGE == 1 ?   7-6 //  1
        : CB_BSIZE == 2 && CB_PAGE == 2 ?   6-6 //  0
        : CB_BSIZE == 2 && CB_PAGE == 3 ?   5-6 // -1
        : CB_BSIZE == 3 && CB_PAGE == 0 ?   9-6 //  3
        : CB_BSIZE == 3 && CB_PAGE == 1 ?   8-6 //  2
        : CB_BSIZE == 3 && CB_PAGE == 2 ?   7-6 //  1
        :                                   6-6;//  0
PW[2:0] = CB_BSIZE - CB_PAGE;                   // same
                                                   as above
PAGE = PW == -3 ? {5'b0,      Cycle[3][2:0]}
     : PW == -2 ?  {4'b0,     Cycle[3][3:0]}
     : PW == -1 ?  {3'b0,     Cycle[3][4:0]}
     : PW ==  0 ?  {2'b0,     Cycle[3][5:0]}
     : PW ==  1 ?  {1'b0,     Cycle[3][6:0]}
     : PW ==  2 ?  {          Cycle[3][7:0]}
     :            {Cycle[4][0], Cycle[3][7:0]};
BLOCK = PW == -3 ? {        Cycle[5], Cycle[4], Cycle[3][7:3]}
      : PW == -2 ?  {1'b0, Cycle[5], Cycle[4], Cycle[3][7:4]}
      : PW == -1 ?  {2'b0, Cycle[5], Cycle[4], Cycle[3][7:5]}
      : PW ==  0 ?  {3'b0, Cycle[5], Cycle[4], Cycle[3][7:6]}
      : PW ==  1 ?  {4'b0, Cycle[5], Cycle[4], Cycle[3][7:7]}
      : PW ==  2 ?  {5'b0, Cycle[5], Cycle[4]}
      :            {6'b0, Cycle[5], Cycle[4][7:1]};
```

-continued

```
// CB_PLSIZE 64Mb = 0 .. 8Gb = 7 or 8MB .. 1GB
PB[3:0] = CB_PLSIZE - CB_PAGE; // PLANE_SIZE / PAGE_SIZE
PLANE = PB == -3 ? {10'b0, BLOCK[20:11]}
      : PB == -2 ? { 9'b0, BLOCK[20:10]}
      : PB == -1 ? { 8'b0, BLOCK[20: 9]}
      : PB ==  0 ? { 7'b0, BLOCK[20: 8]}
      : PB ==  1 ? { 6'b0, BLOCK[20: 7]}
      : PB ==  2 ? { 5'b0, BLOCK[20: 6]}
      : PB ==  3 ? { 4'b0, BLOCK[20: 5]}
      : PB ==  4 ? { 3'b0, BLOCK[20: 4]}
      : PB ==  5 ? { 2'b0, BLOCK[20: 3]}
      : PB ==  6 ? { 1'b0, BLOCK[20: 2]}
      :           {       BLOCK[20: 1]};
DEV = CE1_ == 1'b0 ? 2'd 0;
    : CE2_ == 1'b0 ? 2'd 1
    : CE3_ == 1'b0 ? 2'd 2
    : CE4_ == 1'b0 ? 2'd 3
    : 2'd 0;
```

Similarly, the translation from the internal address format to an address to be transmitted to the attached flash devices may be performed according to the following rules (where CB_[label] corresponds to fields in FIG. 9):

```
Cycle[1][7:0] = COL[7:0];
Cycle[2][7:0] = FB_PAGE == 0 ? {5'b0, R, COL[ 9:8]}
              : FB_PAGE == 1 ?   {4'b0, R, COL[10:8]}
              : FB_PAGE == 2 ?   {3'b0, R, COL[11:8]}
              :                 {2'b0, R, COL[12:8]};
Cycle[3][7:0] = PAGE[7:0];
Cycle[3][0] = PAGE[8];
BLOCK[ ] = CB_PAGE == 0 ? Cycle[ ][ ] :
           CB_PAGE == 1 ?   Cycle[ ][ ] :
           CB_PAGE == 2 ?   Cycle[ ][ ] :
                            Cycle[ ][ ] : ;
PLANE = TBD
FCE1_ = !(DEV == 0 && VALID);
FCE2_ = !(DEV == 1 && VALID);
FCE3_ = !(DEV == 2 && VALID);
FCE4_ = !(DEV == 3 && VALID);
FCE5_ = !(DEV == 4 && VALID);
FCE6_ = !(DEV == 5 && VALID);
FCE7_ = !(DEV == 6 && VALID);
FCE8_ = !(DEV == 7 && VALID);
```

Other translations that may be performed by the other translations unit 509 may include a test to ensure that the amount of configured memory reported to the host is the same as or less than the amount of physically-attached memory. Addition, if the configured page size reported to the host is different than the discovered page size in the attached devices, a translation may be performed by the other translations unit 509. For example, if the configured page size is larger than the discovered page size, the memory request may be performed to multiple flash memory devices to form a page of the configured size. If the configured page size is larger than the discovered page size multiplied by the number of flash memory devices, the request may be performed as multiple operations to multiple pages on each device to form a page of the configured size. Similarly, if the redundant area size differs between the configured size reported to the host and the attached flash devices, the other translation unit 509 may concatenate two blocks and their redundant areas. If the organization reported to the host is narrower than the organization of the attached devices, the translation unit 509 may select a byte or bytes from the data provided by the attached devices to be output as the data for the request.

Presentation Translation

Figure 6:
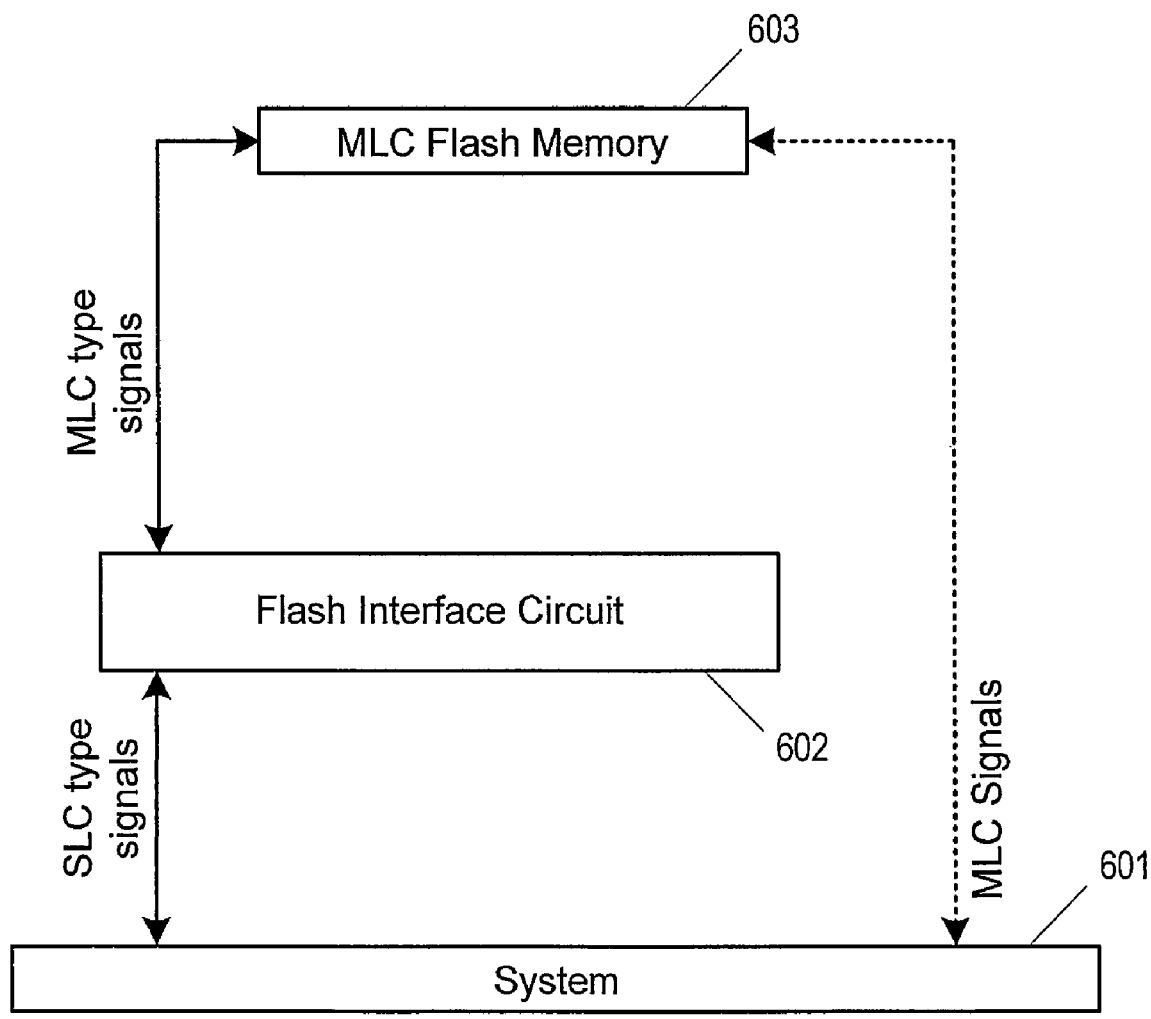
FIG. 6 illustrates a block diagram of one embodiment of one or more MLC-type flash memory devices presented to the system as an SLC-type flash memory device through a flash interface circuit.

In the embodiment of FIG. 6, some or all signals of a multi-level cell (MLC) flash device 603 pass through a flash interface circuit 602 disposed between the MLC flash device and the system 601. In this embodiment, the flash interface circuit presents to the system as a single level cell (SLC)-type flash memory device. Specifically, the values representative of an SLC-type flash memory device appear coded into a configuration block that is presented to the system. In the illustrated embodiment, some MLC signals are presented to the system 601. In other embodiments, all MLC signals are received by the flash interface circuit 602 and are converted to SLC signals for interface to the system 601.

Power Supply

In some of the embodiments described above it is necessary to electrically connect one of more flash memory chips and one of more flash interface circuits to a system. These components may or may not be capable of operating from the same supply voltage. If, for example, the supply voltages of portion(s) the flash memory and portions(s) flash interface circuit are different, there are many techniques for either translating the supply voltage and/or translating the logic levels of the interconnecting signals. For example, since the supply currents required for portion(s) (e.g. core logic circuits, etc.) of the flash memory and/or portion(s) (e.g. core logic circuits, etc.) of the flash interface circuit may be relatively low (e.g. of the order of several milliamperes, etc.), a resistor (used as a voltage conversion resistor) may be used to translate between a higher voltage supply level and a lower logic supply level. Alternatively, a switching voltage regulator may be used to translate supply voltage levels. In other embodiments it may be possible to use different features of the integrated circuit process to enable or eliminate voltage and level translation. Thus for example, in one technique it may be possible to employ the I/O transistors as logic transistors, thus eliminating the need for voltage translation. In a similar fashion because the speed requirement for the flash interface circuit are relatively low (e.g. currently of the order of several tens of megaHertz, etc.) a relatively older process technology (e.g. currently 0.25 micron, 0.35 micron, etc) may be employed for the flash interface circuit compared to the technology of the flash memory (e.g. 70 nm, 110 nm, etc.). Or in another embodiment a process that provides transistors that are capable of operating at multiple supply voltages may be employed.

Figure 10:
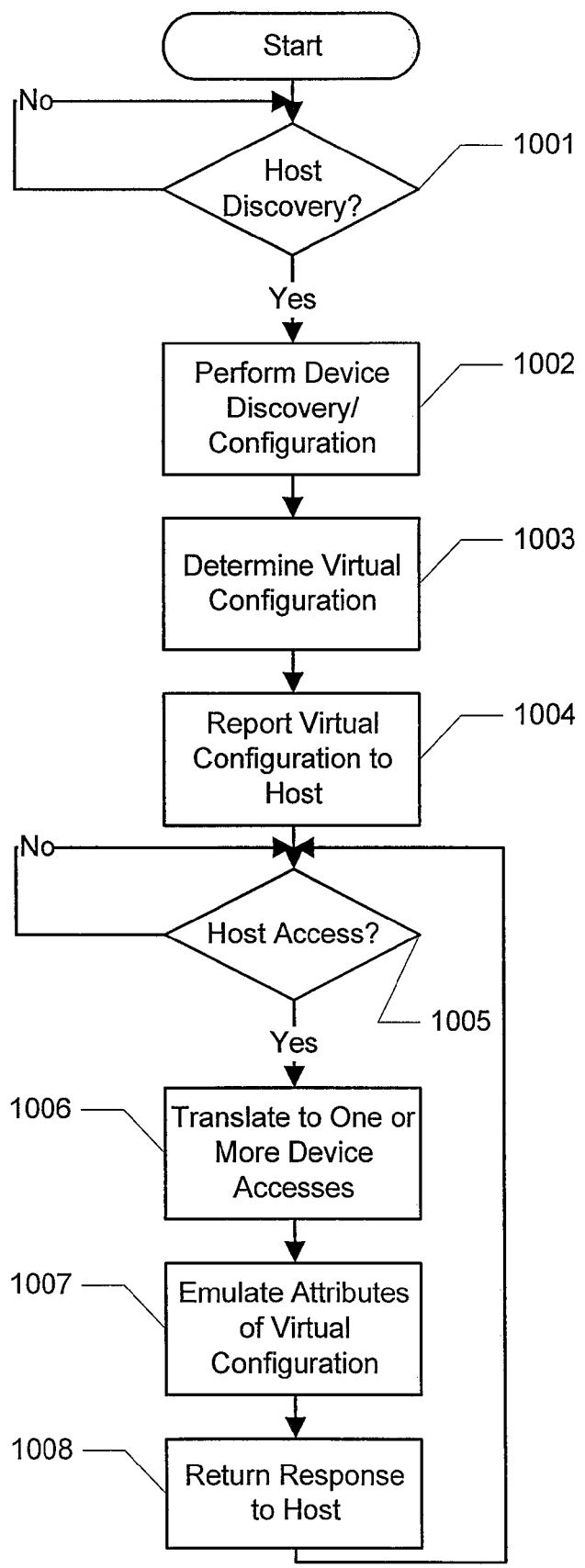
FIG. 10 is a flowchart illustrating one embodiment of a method of emulating one or more virtual flash memory devices using one or more physical flash memory devices having at least one differing attribute.

FIG. 10 is a flowchart illustrating one embodiment of a method of emulating one or more virtual flash memory devices using one or more physical flash memory devices having at least one differing attribute. The method may be implemented, e.g., in the flash interface circuit embodiments described herein.

After power up, the flash interface circuit may wait for the host system to attempt flash discovery (decision block 1001). When flash discovery is requested from the host (decision block 1001, "yes" leg), the flash interface circuit may perform device discovery/configuration for the physical flash memory devices coupled to the flash interface circuit (block 1002). Alternatively, the flash interface circuit may configure the physical flash memory devices before receiving the host discovery request. The flash interface circuit may determine the virtual configuration based on the discovered flash memory devices and/or other data (e.g. ROM data) (block 1003). The flash interface circuit may report the virtual configuration to the host (block 1004), thus exposing the virtual configuration to the host rather than the physical configuration.

For each host access (decision block 1005), the flash interface circuit may translate the request into one or more physical flash memory device accesses (block 1006), emulate attributes of the virtual configuration that differ from the physical flash memory devices (block 1007), and return an appropriate response to the request to the host (block 1008).

The above description, at various points, refers to a flash memory controller. The flash memory controller may be part of the host system, in one embodiment (e.g. the flash memory controller 108 shown in FIG. 1). That is, the flash interface circuit may be between the flash memory controller and the flash memory devices (although some signals may be directly coupled between the system and the flash memory devices, e.g. as shown in FIG. 1). For example, certain small processors for embedded applications may include a flash memory interface. Alternatively, larger systems may include a flash memory interface in a chipset, such as in a bus bridge or other bridge device.

In various contemplated embodiments, an interface circuit may be configured to couple to one or more flash memory devices and may be further configured to couple to a host system. The interface circuit is configured to present at least one virtual flash memory device to the host system, and the interface circuit is configured to implement the virtual flash memory device using the one or more flash memory devices to which the interface circuit is coupled. In one embodiment, the virtual flash memory device differs from the one or more flash memory devices in at least one aspect (or attribute). In one embodiment, the interface circuit is configured to translate a protocol implemented by the host system to a protocol implemented by the one or more flash memory devices, and the interface circuit may further be configured to translate the protocol implemented by the one or more flash memory devices to the protocol implemented by the host system. Either protocol may be a NAND protocol or a NOR protocol, in some embodiments. In one embodiment, the virtual flash memory device is pin-compatible with a standard pin interface and the one or more flash memories are not pin-compatible with the standard pin interface. In one embodiment, the interface circuit further comprises at least one error detection circuit configured to detect errors in data from the one or more flash memory devices. The interface circuit may still further comprise at least one error correction circuit configured to correct a detected error prior to forwarding the data to the host system. In an embodiment, the interface circuit is configured to implement wear leveling operations in the one or more flash memory devices. In an embodiment, the interface circuit comprises a prefetch circuit configured to generate one or more prefetch operations to read data from the one or more flash memory devices. In one embodiment, the virtual flash memory device comprises a data bus having a width equal to N times a width of a data bus of any one of the one or more flash devices, wherein N is an integer greater than one. In one embodiment, the interface circuit is configured to interleave data on the buses of the one or more flash memory devices to implement the data bus of the virtual flash memory device. In another embodiment, the interface circuit is configured to operate the data buses of the one or more flash memory devices in parallel to implement the data bus of the virtual flash memory device. In an embodiment, the virtual flash memory device has a bandwidth that exceeds a bandwidth of the one or more flash memory devices. In one embodiment, the virtual flash memory device has a latency that is less than the latency of the one or more flash memory devices. In an embodiment, the flash memory device is a multi-level cell (MLC) flash device, and the virtual flash memory device presented to the host system is a single-level cell (SLC) flash device.

Numerous variations and modifications will become apparent to those skilled in the art once the above disclosure is fully appreciated. It is intended that the following claims be interpreted to embrace all such variations and modifications.

What is claimed is:

1. An interlace circuit configured to couple to one or more flash memory devices, comprising:
 a read-only memory (ROM) storing fixed configuration information associated with the one or more flash memory devices;
 discovery topic circuitry configured to:
  detect a physical configuration for the one or more flash memory devices, and
  determine a virtual configuration for the one or more flash memory devices based on, at least in part, the physical configuration and based on, at least in part, the fixed configuration information stored in the ROM;
 configuration logic circuitry configured to store the virtual configuration for one or more virtual flash memory devices; and
 a translation unit configured to:
  receive a request from a host system to access at least one of the one or more flash memory devices, wherein information associated with the request is based on the virtual configuration for the one or more virtual flash memory devices, and
  translate the request received from the host system to a translated request that includes information associated with the physical configuration for the one or more flash memory devices.

2. The interface circuit as recited in claim 1, wherein the one or more virtual flash memory devices comprise a capacity greater than any one of the one or more flash memory devices.

3. The interface circuit as recited in claim 1, wherein the one or mare virtual flash memory devices comprise a capacity equal to a sum of the capacities of the one or more flash memory devices.

4. The interface circuit as recited in claim 1, wherein the discovery logic is further configured to compute one or more parameters of the virtual flash memory device.

5. The interface circuit as recited in claim 4, wherein the one or more parameters are reported to the host system.

6. The interface circuit as recited in claim 1, wherein the translation unit is configured to translate a protocol implemented by the host system to a protocol implemented by the one or more flash memory devices.

7. The interface circuit as recited in claim 1, wherein, if a block of data locations in the one or more virtual flash memory devices is detected to be bad, then the interface circuit is configured to remap addresses in the block from a first set of storage locations in the one or more flash memory devices to a second set of storage locations in the one or more flash memory devices.

8. The interface circuit as recited in claim 1, wherein the interface circuit is configured to generate an erasure operation independent of a write operation.

9. The interface circuit as recited in claim 8, wherein the erasure operation erases a block in one of the one or more flash memory devices, wherein the block has been marked as garbage for garbage collection.

10. The interface circuit as recited in claim 8, wherein the erasure operation is generated by the interface circuit to pre-erase unused blocks in the one or more flash memory devices.

11. The interface circuit as recited in claim 1, further comprising one or more buffers configured to store write operations provided from the host system, wherein the interface circuit is configured to report that an erasure operation corresponding to a write operation has completed prior to actual completion of the erasure operation, and wherein the interface circuit is configured to store the write operation in the buffer until the erasure operation is actually complete.

12. The interface circuit as recited in claim 1, wherein the discovery logic circuitry is further configured to discover attributes of the one or more flash memory devices.

13. An apparatus comprising:
 one or more flash memory devices; and
 an interface circuit, including:
  a read-only memory (ROM) storing fixed configuration information associated with the one or more flash memory devices;
  discovery logic circuitry configured to:
   detect a physical configuration for the one or more flash memory devices, and
   determine a virtual configuration for the one or more flash memory devices based on, at least in part, the physical configuration and based on, at least in part, the fixed configuration information stored in the ROM, and
  configuration logic circuitry configured to store the virtual configuration for one or more virtual flash memory devices,
 wherein the interface circuit is coupled to a host system,
 wherein the interface circuit is configured to present a standard interface to the host system and is configured to provide another interface to the one or more flash memory devices that differs from the standard interface, wherein the standard interface is associated with the physical configuration and the another interface is associated with the virtual configuration.

14. The apparatus as recited in claim 13 wherein the standard interface is pin-compatible with a previous generation of flash memory devices.

15. The apparatus as recited in claim 13 wherein the interface circuit and the one or more flash memory devices are stacked.

16. The apparatus as recited in claim 13 wherein the one or more flash memory devices and the interface circuit are integrated onto a single semiconductor substrate.

17. An apparatus comprising:
 one or more flash memory devices;
 a flash memory controller; and
 an interface circuit including:
  a read-only memory (ROM) storing fixed configuration information associated with the one or more flash memory devices,
  discovery logic circuitry configured to:
   detect a physical configuration for the one or more flash memory devices, and
   determine a virtual configuration for the one or more flash memory devices based on, at least in part, the physical configuration and based on, at least in part, the fixed configuration information stored in the ROM,
  configuration logic circuitry configured to store the virtual configuration for one or more virtual flash memory devices, and
  a translation unit configured to:
   receive a request from the flash memory controller to access at least one of the one or more flash memory devices, wherein information associated with the request is based on the virtual configuration for the one or more virtual flash memory device, and translate the request received from the flash memory controller to a translated request that includes information associated with the physical configuration for the one or more flash memory devices.

18. The apparatus as recited in claim 17, wherein the translation unit is further configured to translate a protocol implemented by the flash memory controller to a protocol implemented by the one or more flash memory devices, and wherein the translation unit is further configured to translate the protocol implemented by the one or more flash memory devices to the protocol implemented by the flash memory controller.

19. The apparatus as recited in claim 17 wherein the protocol implemented by the flash memory controller is one of a NAND protocol or a NOR protocol and the protocol implemented by the flash memory controller is the other one of the NAND protocol and the NOR protocol.

* * * * *

UNITED STATES PATENT AND TRADEMARK OFFICE
CERTIFICATE OF CORRECTION

PATENT NO. : 8,055,833 B2  
APPLICATION NO. : 11/611374  
DATED : November 8, 2011  
INVENTOR(S) : Radoslav Danilak et al.

Page 1 of 1

It is certified that error appears in the above-identified patent and that said Letters Patent is hereby corrected as shown below:

Title page, column 1, Inventors: delete "Jose" and insert --San Jose-- therefore.

Column 15, line 4, claim 1, delete "interlace" and insert --interface-- therefore.

Column 15, line 9, claim 1, delete "topic" and insert --logic-- therefore.

Column 15, line 34, claim 3, delete "mare" and insert --more-- therefore.

Column 16, line 67, claim 17, delete "device" and insert --devices-- therefore.

Signed and Sealed this  
Twenty-first Day of February, 2012

David J. Kappos  
*Director of the United States Patent and Trademark Office*